(12) United States Patent
Tewari et al.

(10) Patent No.: US 8,787,572 B1
(45) Date of Patent: Jul. 22, 2014

(54) ENHANCED ASSOCIATION FOR ACCESS POINTS

(75) Inventors: Claudius Tewari, Sunnyvale, CA (US); Brian Bosso, San Jose, CA (US); Chor-Teck Law, San Jose, CA (US); Heng-Jui H. Hsu, San Jose, CA (US); James Chieh-Tsung Chen, Santa Clara, CA (US); James Chih-Shi Yee, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 151 days.

(21) Appl. No.: 13/397,536

(22) Filed: Feb. 15, 2012

Related U.S. Application Data

(63) Continuation of application No. 11/359,944, filed on Feb. 21, 2006, now Pat. No. 8,126,145.

(60) Provisional application No. 60/678,269, filed on May 4, 2005, provisional application No. 60/684,365, filed on May 25, 2005, provisional application No. 60/693,459, filed on Jun. 22, 2005, provisional application No. 60/709,977, filed on Aug. 19, 2005.

(51) Int. Cl.
*H04L 12/54* (2013.01)

(52) U.S. Cl.
USPC .......................................... 380/255; 370/401

(58) Field of Classification Search
None
See application file for complete search history.

(56) References Cited

U.S. PATENT DOCUMENTS

| 5,886,699 | A | 3/1999 | Belfiore et al. |
|---|---|---|---|
| 7,096,500 | B2 | 8/2006 | Roberts et al. |
| 7,236,471 | B2 | 6/2007 | Backes et al. |
| 2004/0030895 | A1 | 2/2004 | Tachikawa et al. |
| 2004/0165549 | A1 | 8/2004 | Backes et al. |
| 2004/0165556 | A1 | 8/2004 | Backes et al. |
| 2004/0165557 | A1 | 8/2004 | Backes et al. |
| 2004/0166837 | A1 | 8/2004 | Backes |
| 2004/0166844 | A1 | 8/2004 | Backes et al. |

(Continued)

FOREIGN PATENT DOCUMENTS

| WO | WO2004/077711 A2 | 9/2004 |
|---|---|---|
| WO | WO2004/077851 A1 | 9/2004 |

OTHER PUBLICATIONS

"Draft Standard Specifications for Password-based Public Key Cryptographic Techniques," Mar. 28, 2005, IEEE 1363.2, 162 pages.

(Continued)

*Primary Examiner* — Jeffrey Pwu
*Assistant Examiner* — Nega Woldemariam

(57) ABSTRACT

Techniques and systems for associating a client with an access point using a security protocol are described. A described technique includes initiating an association request; establishing an association between a first device and a second device different from the first device based on the association request; participating in a handshake including exchanging an operational key between the first device and the second device during the handshake; and entering an operational phase using the operational key when the handshake is successful. Participating in the handshake can include participating in an authenticated handshake when the association request indicates an authenticated access, and participating in an unauthenticated handshake when the association request indicates an unauthenticated access.

20 Claims, 17 Drawing Sheets

(56) References Cited

U.S. PATENT DOCUMENTS

| | | | |
|---|---|---|---|
| 2004/0166845 A1 | 8/2004 | Backes | |
| 2004/0166846 A1 | 8/2004 | Backes et al. | |
| 2004/0166847 A1 | 8/2004 | Backes et al. | |
| 2004/0166848 A1 | 8/2004 | Backes et al. | |
| 2004/0166850 A1 | 8/2004 | Backes | |
| 2004/0166851 A1 | 8/2004 | Backes et al. | |
| 2004/0166866 A1 | 8/2004 | Backes et al. | |
| 2004/0166868 A1 | 8/2004 | Backes et al. | |
| 2004/0166870 A1 | 8/2004 | Backes | |
| 2004/0166871 A1 | 8/2004 | Backes et al. | |
| 2004/0170140 A1 | 9/2004 | Backes et al. | |
| 2004/0190470 A1 | 9/2004 | Backes | |
| 2004/0190478 A1 | 9/2004 | Backes et al. | |
| 2004/0192278 A1 | 9/2004 | Backes et al. | |
| 2004/0192279 A1 | 9/2004 | Backes et al. | |
| 2004/0192300 A1 | 9/2004 | Backes et al. | |
| 2004/0192325 A1 | 9/2004 | Backes et al. | |
| 2004/0202122 A1 | 10/2004 | Backes | |
| 2004/0202130 A1 | 10/2004 | Backes et al. | |
| 2004/0203688 A1 | 10/2004 | Backes et al. | |
| 2004/0203689 A1 | 10/2004 | Backes et al. | |
| 2004/0248580 A1 | 12/2004 | Backes et al. | |
| 2005/0004875 A1 | 1/2005 | Kontio et al. | |
| 2005/0020266 A1 | 1/2005 | Backes et al. | |
| 2005/0026610 A1 | 2/2005 | Backes et al. | |
| 2005/0026611 A1 | 2/2005 | Backes | |
| 2005/0070264 A1 | 3/2005 | Backes et al. | |
| 2005/0090241 A1 | 4/2005 | Backes et al. | |
| 2005/0090250 A1 | 4/2005 | Backes | |
| 2005/0114653 A1* | 5/2005 | Sudia | 713/158 |
| 2005/0223111 A1 | 10/2005 | Bhandaru et al. | |
| 2006/0070130 A1 | 3/2006 | Costea et al. | |
| 2006/0075500 A1 | 4/2006 | Bertman et al. | |
| 2006/0101282 A1 | 5/2006 | Costea et al. | |
| 2006/0130141 A1 | 6/2006 | Kramer et al. | |
| 2006/0165103 A1 | 7/2006 | Trudeau et al. | |
| 2006/0179475 A1 | 8/2006 | Zhang et al. | |
| 2006/0218393 A1* | 9/2006 | Hernandez et al. | 713/167 |
| 2006/0230279 A1 | 10/2006 | Morris et al. | |
| 2006/0288407 A1 | 12/2006 | Naslund et al. | |

OTHER PUBLICATIONS

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band", IEEE 802.11g, 2003.

"Draft Supplement to—Information Technology Telecommunications and Information Exchange Between Systems—Local Area Networks—Media Access Control (MAC) Bridges-Supplement for Support of IEEE 802.11", May 1998, LAN MAN Standard Committee of the IEEE Computer Society, P802.11c, 8 pages.

IEEE Trial-Use Recommended Practice for Multi-Vendor Access Point Interoperability via an Inter-Access Point Protocol Across Distribution Systems Supporting IEEE 802.11 Operation, Jul. 14, 2003, IEEE Computer Society, 802.11f, 78 pages.

"Part 11: Wireless LAN Medium Access Control (MAC) and Physical Layer (PHY) specifications: Higher-Speed Physical Layer Extension in the 2.4 GHz Band", 1999, IEEE Std 802.11a, 91 pages.

Part 11: Wireless LAN Medium Access Control (MAC) and Physical Layer (PHY) specifications—Amendment 8: Medium Access Control (MAC) Quality of Service Enhancements, IEEE Std. 802.11e, 2005.

"Part 11: Wireless LAN Medium Access Control (MAC) and Physical Layer (PHY) specifications: Amendment 5: Spectrum and Transmit Power Management Extensions in the 6 GHz band in Europe" IEEE Std. 802.11h, 2003.

"Part 11: Wireless LAN Medium Access Control (MAC) and Physical Layer (PHY) Specifications; Amendment 3: Specification for Operation in Additional Regulatory Domains", 2001, IEEE Standard 802.11d, 34 pages.

"Part II: Wireless LAN Medium Access Control (MAC) and Physical Layer (PHY) specifications: Higher-Speed Physical Layer Extension in the 2.4 GHz Band", IEEE Std. 802.11b, 1999.

"Standard Specifications for Public Key Cryptography: Identity Based Key Agreement Scheme (IBKAS)", Jan. 29, 2008, IEEE 1363.3, 9 pages.

"TGn Sync Proposal Technical Specification", May 2005, IEEE Std. 802.11n, 131 pages.

Abdalla, M. et al. "DHIES: An Encryption Scheme Based on the Diffie-Hellman Problem", Sep. 18, 2001, 31 pages.

Diffie et al., "New Directions in Cryptography", Jun. 3, 1976, to be published by the USPTO, 13 pages.

El Gamal, Taher, "A Pubic Key Cryptosystem and a Signature Scheme Based on Discrete Logarithms", *Advances in Cryptology—CRYPTO 84*, LNCS 196, pp. 10-18, 1985.

Harkins, D. et al., Carrel, RFC 2409 (Updated by RFC 4109), "The Internet Key Exchange (IKE)," IETF, 83 (1998).

IEEE Computer Society, *"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 6: Medium Access Control (MAC) Security Enhancements"*, IEEE Std 802.11i—2004.

PKCS #5 v2.0: Password-Based Cryptography Standard, Mar. 25, 1999, RSA Laboratories.

Schaad, J. et al., "Advanced Encryption Standard (AES) Key Wrap Algorithm," RFC 3394, IETF, Sep. 2002, The Internet Society, 83 pages.

Schneier, Bruce, *Applied Cryptography*, Second Ed., 1996, pp. 476-479.

"IEEE Standard for Information technology—Telecommunications and information exchange between systems—Local and metropolitan area networks—Specific requirements; Part 2: Logical Link Control," 1998, IEEE 802.2, 253 pages.

* cited by examiner

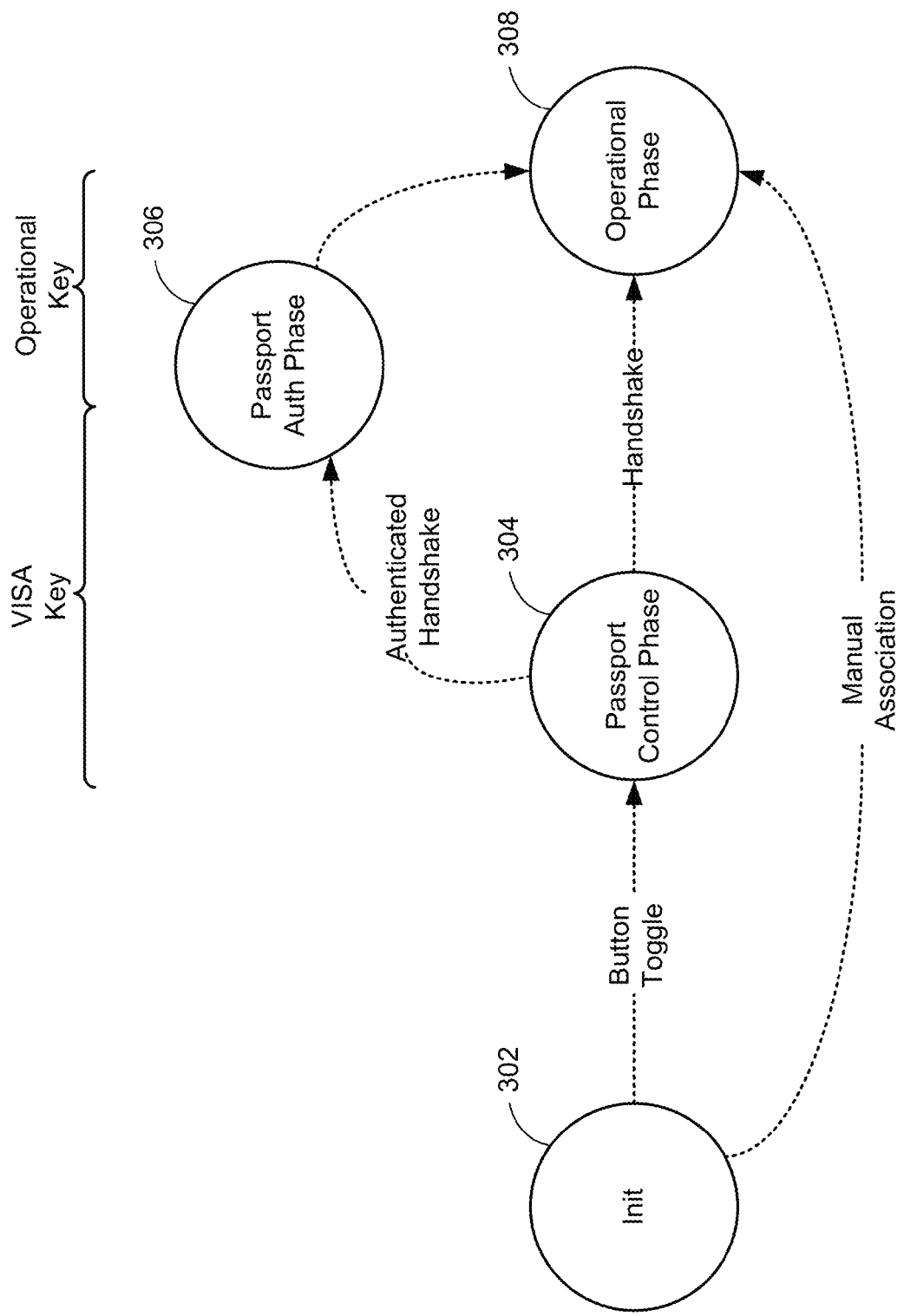

ENHANCED ASSOCIATION FOR ACCESS POINTS

CROSS-REFERENCE TO RELATED APPLICATIONS

This application is a continuation application of, and claims priority to, pending U.S. patent application Ser. No. 11/359,944, filed on Feb. 21, 2006, entitled "Enhanced Association For Access Points", which claim priority from U.S. Provisional Patent Application No. 60/678,269, filed on May 4, 2005, U.S. Provisional Patent Application No. 60/684,365, filed on May 25, 2005, U.S. Provisional Patent Application No. 60/693,459, filed on Jun. 22, 2005, and U.S. Provisional Patent Application No. 60/709,977, filed Aug. 19, 2005, each of which is incorporated herein by reference in its entirety.

TECHNICAL FIELD

The invention relates to communication systems and methods.

BACKGROUND OF THE INVENTION

The recent explosion of wireless networks in residential and enterprise environments demands advanced security methods and standards. In a conventional wireless local area network (WLAN), an access point (AP) connects users to other users within a given network through a series of encryption and decryption schemes.

However, these encryption and decryption schemes, which involve initializing various security methods such as Wired Equivalent Privacy (WEP), Wi-Fi Protected Access Temporal-Key Integrity Protocol (WPA-TKIP), Wi-Fi Protected Access-2 Advanced Encryption Standard (WPA-2 AES), are complicated and confusing to most end users. Even to skilled users the configuration of service set identifier (SSID), channel, symmetric encryption algorithms, pre-shared key mode (PSK), IEEE 802.11 standards, open and shared authentication, passphrases and the like can be time consuming.

These manual routines place a significant burden on end users to obtain advanced knowledge of computer security to guard against unauthorized access. Due to the complexity involved during setup, many wireless home networks are improperly or insecurely installed, leaving end users vulnerable for potential unauthorized access.

SUMMARY OF THE INVENTION

According to one aspect, a method is disclosed to automatically associate a client with an access point using a security protocol. The method includes initializing a communication request by one of an access point and a client, generating a key and transmitting the key and a unique service set identifier identifying the access point to the client. The client associates with the access point using at least one of the key and the unique service set identifier, and initiates a handshake request from the client. Upon receiving the handshake request, the access point participates in a handshake, exchanging operational information during a key exchange between the access point and the client. The access point establishes an encrypted operational key if the key exchange is authenticated, and enters an operational phase using the operational key and the unique service set identifier.

According to another aspect, a method to authenticate an access point with a client is provided. The method includes initiating a communication request including broadcasting available modes of access associated with the access point, providing a unique service set identifier, participating in a handshake upon receiving an initiate message from a client, initiating a key exchange, and exchanging operational information during the key exchange. If authenticated access is requested, the method includes transmitting an encrypted operational key if the operational information is authenticated, else transmitting the encrypted operational key without separate authentication. The method further includes entering an operational phase using the operational key and the unique service set identifier.

The method can further include retrieving an identity of the client and confirming authorization of the client prior to exchanging operational information if authenticated access is requested. Confirming authorization can include aborting the authentication after determining the client does not have authorized access. Initiating a communication request can include waiting for a probe request, and in response to the probe request, acknowledging a capability to communicate including sending an information element to the client describing the available access modes associated with the access point.

The method can include providing a client-specific WEP, WPA-PSK or WPA2-PSK pair-wise master key (PMK) for establishing a secure WEP/WPA/WPA2 session between the access point and the client. The unique service set identifier can include a service set identifier (SSID) and a media access control (MAC) address. Initiating a communication request can be performed using a physical button or a graphical user interface (GUI). The method can include determining a failure of the authentication between the access point and the client if a duration of initiating a communication request exceeds a predetermined timeout value. The key exchange can be an asymmetric Diffie-Hellman key exchange to establish a shared secret key between the access point and the client. The method can include encrypting the operational key using the shared secret key derived from the asymmetric Diffie-Hellman key exchange and a key wrap algorithm based on National Institute of Standards and Technology Advanced Encryption Standard (NIST AES). The method can further include maintaining a list of media access control (MAC) addresses from a plurality of clients associated with the authentication, and prohibiting the client from entering the operational phase if the operational information is invalidated.

According to another aspect, a method for associating a client with an access point is provided. The method includes initiating a communication request, providing a unique service set identifier, participating in a handshake upon receiving an initiate message from a client, determining whether authentication of the client is required. If not, the method includes initiating a key exchange without separately authenticating the client, exchanging operational information during the key exchange, transmitting an encrypted operational key if the operational information is validated, and entering an operational phase using the operational key and the unique service set identifier.

According to another aspect, a method for associating a client with an access point is provided. The method includes providing a unique service set identifier, participating in a handshake with a client, advertising access modes from a plurality of available modes for communicating with the access point at least one of which requires authentication of the client and one of which does not, determining if authentication of the client is not required, and if so, initiating a key exchange without separately authenticating the client, determining if authentication of the client is required, and if so, initiating a key exchange including authenticating the client, exchanging operational information during the key exchange, transmitting an encrypted operational key if the operational information is authenticated or if no authentication is required, and entering an operational phase using the operational key and the unique service set identifier.

According to another aspect, a method for associating a client with an access point is provided. The method includes providing a unique service set identifier, participating in a handshake with a client, advertising access modes from a plurality of available modes for communicating with the access point at least one of which requires authentication of the client and one of which does not, exchanging operational information during a key exchange including authenticating the client as required, transmitting an encrypted operational key to the client after the exchange of operational information, and entering an operational phase using the operational key and the unique service set identifier.

According to another aspect, a method for associating a client with an access point is provided. The method includes transmitting a probe request for identifying a desired access point having connection capability that does not require separate authentication of the client, sending an association request for associating with the identified access point, participating in a key exchange, exchanging operational information during the key exchange, receiving and decrypting an encrypted operational key, and entering an operational phase using the operational key.

Identifying a desired access point can include evaluating a signal strength between the access point and the client. The method can include selecting a new access point having a next highest signal strength if an authentication with the access point fails. The method can include providing a client-specific WEP, WPA-PSK or WPA2-PSK pair-wise master key (PMK) for establishing a secure WEP/WPA/WPA2 session between the access point and the client. The method can include determining if the client fails to establish the secure session with the access point using a pair-wise master key, and selecting a new access point after determining the client has failed to establish the secure session in a predetermined number of attempts. The key exchange can be an asymmetric Diffie-Hellman key exchange to establish a shared secret key between the access point and the client, and the method can include decrypting the operational key using the shared secret key derived from the Diffie-Hellman key exchange. Moreover, the method can include displaying a status of the key exchange to a user prior to entering the operational phase.

According to another aspect, a method for associating a client with an access point is provided. The method includes transmitting a probe request for identifying a desired access point having connection capability, sending an association request for associating with the identified access point, participating in a key exchange, exchanging operational information during the key exchange, receiving and decrypting an encrypted operational key if the operational information is authenticated, and entering an operational phase using the operational key. The method can include prompting a request for a password to a user of the client prior to association with the access point, and prompting the request can include receiving the password through a user interface unit associated with the client.

According to another aspect, a method for associating a client with an access point is provided. The method includes transmitting a probe request for identifying a desired access point having connection capability selected from a plurality of available connection capabilities, sending an association request for associating with the identified access point, participating in a key exchange, exchanging operational information during the key exchange including authenticating the client to the access point as required, receiving and decrypting an encrypted operational key, and entering an operational phase using the operational key.

According to another aspect, a method for associating a client with an access point is provided. The method includes determining a desired communication mode from a plurality of available communication modes including at least one requiring authentication of the client and one not, transmitting a probe request for identifying a desired access point having the determined connection capability, evaluating responses received from one or more access points including evaluating connection capabilities of a given access point and identifying an access point for connection to, sending an association request for associating with the identified access point, participating in a key exchange, exchanging operational information during the key exchange including authenticating the client to the access point as required, receiving and decrypting an encrypted operational key, and entering an operational phase using the operational key.

According to another aspect, a method for associating a client with an access point is provided. The method includes participating in a handshake with an access point, receiving from the access point available modes of communication from a plurality of modes of communication with the access point at least one of which requires authentication of the client and one of which does not, exchanging operational information during a key exchange including authenticating the client to the access point as required, receiving an operational key, and entering an operational phase using the operational key and the unique service set identifier.

The described systems and techniques can be implemented in electronic circuitry, computer hardware, firmware, software, or in combinations of them, such as the structural means disclosed in this specification and structural equivalents thereof. This can include a program operable to cause one or more machines (e.g., an access point device, or a client device, including a programmable processor) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

For example, the disclosed embodiment(s) below can be implemented in various systems and apparatus, including, but not limited to, a special purpose machine (e.g., a wireless access point, a remote environment monitor, a router, a switch, a computer system component, a medium access unit), a mobile data processing machine (e.g., a wireless client, a cellular telephone, a personal digital assistant (PDA), a mobile computer, a digital camera), a general purpose data processing machine (e.g., a minicomputer, a server, a mainframe, a supercomputer), or combinations of these.

Thus, in another aspect, an apparatus includes an access point including an activation device and an association engine, the activation device configured to initiate a communication request including broadcasting available modes of access associated with the access point, the association engine configured to provide a unique service set identifier, the association engine configured to participate in a handshake upon receiving an initiate message from a client, the association engine configured to initiate a key exchange, the association engine configured to exchange operational information during the key exchange, the association engine configured to, if authenticated access is requested, transmit an encrypted operational key if the operational information is authenticated, else transmit the encrypted operational key without separate authentication, and the association engine configured to transition to an operational phase using the operational key and the unique service set identifier.

According to another aspect, an apparatus includes an access point including an activation device and an association engine, the activation device configured to initiate a communication request, the association engine configured to provide a unique service set identifier, the association engine configured to participate in a handshake upon receiving an initiate message from a client, the association engine configured to determine whether authentication of the client is required, the association engine configured to, if the authentication is not required, initiate a key exchange without separately authenticating the client, the association engine configured to exchange operational information during the key exchange, the association engine configured to transmit an encrypted operational key if the operational information is validated, and the association engine configured to transition to an operational phase using the operational key and the unique service set identifier.

According to another aspect, an apparatus includes an access point including a synchronization engine and an access engine, the synchronization engine configured to provide a unique service set identifier, the synchronization engine configured to participate in a handshake with a client, the access engine configured to advertise access modes from a plurality of available modes for communicating with the access point at least one of which requires authentication of the client and one of which does not, the access engine configured to determine if authentication of the client is not required, and if so, initiate a key exchange without separately authenticating the client, the access engine configured to determine if authentication of the client is required, and if so, initiate a key exchange including authenticating the client, the access engine configured to exchange operational information during the key exchange, the access engine configured to transmit an encrypted operational key if the operational information is authenticated or if no authentication is required, and the access engine configured to enter an operational phase using the operational key and the unique service set identifier.

According to another aspect, an apparatus includes an access point including a synchronization engine and an access engine, the synchronization engine configured to provide a unique service set identifier, the synchronization engine configured to participate in a handshake with a client, the access engine configured to advertise access modes from a plurality of available modes for communicating with the access point at least one of which requires authentication of the client and one of which does not, the access engine configured to exchange operational information during a key exchange including authenticating the client as required, the access engine configured to transmit an encrypted operational key to the client after the exchange of operational information, and the access engine configured to enter an operational phase using the operational key and the unique service set identifier.

According to another aspect, an apparatus includes a client including an activation device and an association engine, the activation device configured to transmit a probe request for identifying a desired access point having connection capability that does not require separate authentication of the client, the association engine configured to send an association request for associating with the identified access point, the association engine configured to participate in a key exchange, the association engine configured to exchange operational information during the key exchange, the association engine configured to receive and decrypt an encrypted operational key, and the association engine configured to enter an operational phase using the operational key.

According to another aspect, an apparatus includes a client including an activation device and an association engine, the activation device configured to transmit a probe request for identifying a desired access point having connection capability, the association engine configured to send an association request for associating with the identified access point, the association engine configured to participate in a key exchange, the association engine configured to exchange operational information during the key exchange, the association engine configured to receive and decrypt an encrypted operational key if the operational information is authenticated, and the association engine configured to enter an operational phase using the operational key.

According to another aspect, an apparatus includes a client including an activation device and an association engine, the activation device configured to transmit a probe request for identifying a desired access point having connection capability selected from a plurality of available connection capabilities, the association engine configured to send an association request for associating with the identified access point, the association engine configured to participate in a key exchange, the association engine configured to exchange operational information during the key exchange including authenticating the client to the access point as required, the association engine configured to receive and decrypt an encrypted operational key, and the association engine configured to enter an operational phase using the operational key.

According to another aspect, an apparatus includes a client including an activation device and an association engine, the activation device configured to determine a desired communication mode from a plurality of available communication modes including at least one requiring authentication of the client and one not, the activation device configured to transmit a probe request for identifying a desired access point having the determined connection capability, the activation device configured to evaluate responses received from one or more access points including evaluating connection capabilities of a given access point and identifying an access point for connection to, the association engine configured to send an association request for associating with the identified access point, the association engine configured to participate in a key exchange, the association engine configured to exchange operational information during the key exchange including authenticating the client to the access point as required, the association engine configured to receive and decrypt an encrypted operational key, and the association engine configured to enter an operational phase using the operational key.

According to another aspect, an apparatus includes a client including a synchronization engine and an access engine, the synchronization engine configured to participate in a handshake with an access point, the access engine configured to receive from the access point available modes of communication from a plurality of modes of communication with the access point at least one of which requires authentication of the client and one of which does not, the access engine configured to exchange operational information during a key exchange including authenticating the client to the access point as required, the access engine configured to receive an operational key, and the access engine configured to enter an operational phase using the operational key and the unique service set identifier.

According to another aspect, an apparatus can include means for initiating a communication request including broadcasting available modes of access associated with an access point, means for providing a unique service set identifier, means for participating in a handshake upon receiving an initiate message from a client, means for initiating a key exchange, means for exchanging operational information during the key exchange, means for transmitting, if authenticated access is requested, an encrypted operational key if the operational information is authenticated, else transmitting the encrypted operational key without separate authentication, and means for entering an operational phase using the operational key and the unique service set identifier.

The apparatus can further include means for retrieving an identity of the client and means for confirming authorization of the client prior to exchanging operational information if authenticated access is requested. The means for confirming authorization can include means for aborting the authentication after determining the client does not have authorized access. The means for initiating a communication request can include means for waiting for a probe request, and in response to the probe request, acknowledging a capability to communicate including sending an information element to the client describing the available access modes associated with the access point.

The apparatus can include means for providing a client-specific WEP, WPA-PSK or WPA2-PSK pair-wise master key (PMK) for establishing a secure WEP/WPA/WPA2 session between the access point and the client. The unique service set identifier can include a service set identifier (SSID) and a media access control (MAC) address. The means for initiating a communication request can include physical button means or GUI means. The apparatus can include means for determining a failure of the authentication between the access point and the client if a duration of initiating a communication request exceeds a predetermined timeout value. The key exchange can be an asymmetric Diffie-Hellman key exchange to establish a shared secret key between the access point and the client. The apparatus can include means for encrypting the operational key using the shared secret key derived from the asymmetric Diffie-Hellman key exchange and a key wrap algorithm based on National Institute of Standards and Technology Advanced Encryption Standard (NIST AES). The apparatus can further include means for maintaining a list of media access control (MAC) addresses from a plurality of clients associated with the authentication, and means for prohibiting the client from entering the operational phase if the operational information is invalidated.

According to another aspect, an apparatus includes means for initiating a communication request, means for providing a unique service set identifier, means for participating in a handshake upon receiving an initiate message from a client, means for determining whether authentication of the client is required, means for initiating a key exchange without separately authenticating the client, means for exchanging operational information during the key exchange, means for transmitting an encrypted operational key if the operational information is validated, and means for entering an operational phase using the operational key and the unique service set identifier.

According to another aspect, an apparatus includes means for providing a unique service set identifier, means for participating in a handshake with a client, means for advertising access modes from a plurality of available modes for communicating with the access point at least one of which requires authentication of the client and one of which does not, means for determining if authentication of the client is not required, means for initiating a key exchange without separately authenticating the client, means for determining if authentication of the client is required, means for initiating a key exchange including authenticating the client, means for exchanging operational information during the key exchange, means for transmitting an encrypted operational key if the operational information is authenticated or if no authentication is required, and means for entering an operational phase using the operational key and the unique service set identifier.

According to another aspect, an apparatus includes means for providing a unique service set identifier, means for participating in a handshake with a client, means for advertising access modes from a plurality of available modes for communicating with the access point at least one of which requires authentication of the client and one of which does not, means for exchanging operational information during a key exchange including authenticating the client as required, means for transmitting an encrypted operational key to the client after the exchange of operational information, and means for entering an operational phase using the operational key and the unique service set identifier.

According to another aspect, an apparatus includes means for transmitting a probe request for identifying a desired access point having connection capability that does not require separate authentication of the client, means for sending an association request for associating with the identified access point, means for participating in a key exchange, means for exchanging operational information during the key exchange, means for receiving and decrypting an encrypted operational key, and means for entering an operational phase using the operational key.

The means for identifying a desired access point can include means for evaluating a signal strength between the access point and the client. The apparatus can include means for selecting a new access point having a next highest signal strength if an authentication with the access point fails. The apparatus can include means for providing a client-specific WEP, WPA-PSK or WPA2-PSK pair-wise master key (PMK) for establishing a secure WEP/WPA/WPA2 session between the access point and the client. The apparatus can include means for determining if the client fails to establish the secure session with the access point using a pair-wise master key, and means for selecting a new access point after determining the client has failed to establish the secure session in a predetermined number of attempts. The key exchange can be an asymmetric Diffie-Hellman key exchange to establish a shared secret key between the access point and the client, and the apparatus can include means for decrypting the operational key using the shared secret key derived from the Diffie-Hellman key exchange. Moreover, the apparatus can include means for displaying a status of the key exchange to a user prior to entering the operational phase.

According to another aspect, an apparatus includes means for transmitting a probe request for identifying a desired access point having connection capability, means for sending an association request for associating with the identified access point, means for participating in a key exchange, means for exchanging operational information during the key exchange, means for receiving and decrypting an encrypted operational key if the operational information is authenticated, and means for entering an operational phase using the operational key. The apparatus can include means for prompting a request for a password to a user of the client prior to association with the access point, and the means for prompting the request can include means for receiving the password through a user interface unit associated with the client.

According to another aspect, an apparatus includes means for transmitting a probe request for identifying a desired access point having connection capability selected from a plurality of available connection capabilities, means for sending an association request for associating with the identified access point, means for participating in a key exchange, means for exchanging operational information during the key exchange including authenticating the client to the access point as required, means for receiving and decrypting an encrypted operational key, and means for entering an operational phase using the operational key.

According to another aspect, an apparatus includes means for determining a desired communication mode from a plurality of available communication modes including at least one requiring authentication of the client and one not, means for transmitting a probe request for identifying a desired access point having the determined connection capability, means for evaluating responses received from one or more access points including evaluating connection capabilities of a given access point and identifying an access point for connection to, means for sending an association request for associating with the identified access point, means for participating in a key exchange, means for exchanging operational information during the key exchange including authenticating the client to the access point as required, means for receiving and decrypting an encrypted operational key, and means for entering an operational phase using the operational key.

According to another aspect, an apparatus includes means for participating in a handshake with an access point, means for receiving from the access point available modes of communication from a plurality of modes of communication with the access point at least one of which requires authentication of the client and one of which does not, means for exchanging operational information during a key exchange including authenticating the client to the access point as required, means for receiving an operational key, and means for entering an operational phase using the operational key and the unique service set identifier.

In various implementations, one or more of the following advantages may be present. Users only need to push a button to configure a device. An additional level of security is introduced in an access point initiation process. The additional level of security includes the creation of a password protected channel for initial exchange of messages. Configuration methods disclosed provide a timeout mechanism, in which the session can be terminated if the exchange fails between the AP and the client. Using a security protocol that defines AP challenge request and response message exchange decreases the likelihood for rogue clients to snoop on these exchanges. Further, extra snooping protection is provided, because the system and methods can transmit at low power during exchange of security settings between the AP and the client. A decrease in power translates into a small broadcast range in which fewer rogue clients can sniff settings information for unauthorized access. Because the systems and methods optionally require that clients manually upgrade their security setting to that of an AP (or by default out-of-the-box setting), snooping becomes more difficult for intruders. The systems and methods can be used to deny access to clients having a weak security setting. The systems and methods can be used to allow guest access, and configuration of additional operating parameters including, but not limited to, DHCP, TCP/IP, PPPoE, router credentials such as user name and password and RF channels.

The system and methods proposed meet usability, security, interoperability and performance considerations. In adopting an auto-configuration mechanism, while some conventional applications value ease-of-use configuration over security (e.g., download from camera to printer), others prefer usage complexity in exchange for user friendliness. As will be described, the systems and methods proposed provide enhanced security settings without introducing additional usage complexity, while providing superior support of multiple security levels through a mechanism that is supported among various device types, regardless of application, operation or GUI, etc. With a capability to maintain high levels of interoperability, overhead can be minimized without adding sophisticated latency to the user experience. Further, the systems and methods provide portability to different computer and network devices, and robust connections against security attacks and loopholes, as will be described further below.

In addition to satisfying the notion of a secure and easy setup, the usage model of the present invention is dynamic. The passing and examination of credentials is not static, and is markedly different from the conventional one-dimensional lock-and-key model that can be manipulated without authorization. The details of one or more embodiments of the invention are set forth in the accompanying drawings and the description below. Other features and advantages of the invention will be apparent from the description and drawings, and from the claims.

DESCRIPTION OF DRAWINGS

The accompanying drawings, which are incorporated into and form a part of the specification, illustrate several aspects and implementations of the present invention and, together with the general description given above and detailed description given below, serve to explain the principles of the invention. The drawings are only for the purpose of illustrating preferred embodiments of the invention and are not to be construed as limiting the invention. In the drawings:

FIG. 3 illustrates configuration phases between an AP and client.

DETAILED DESCRIPTION

Figure 1A:
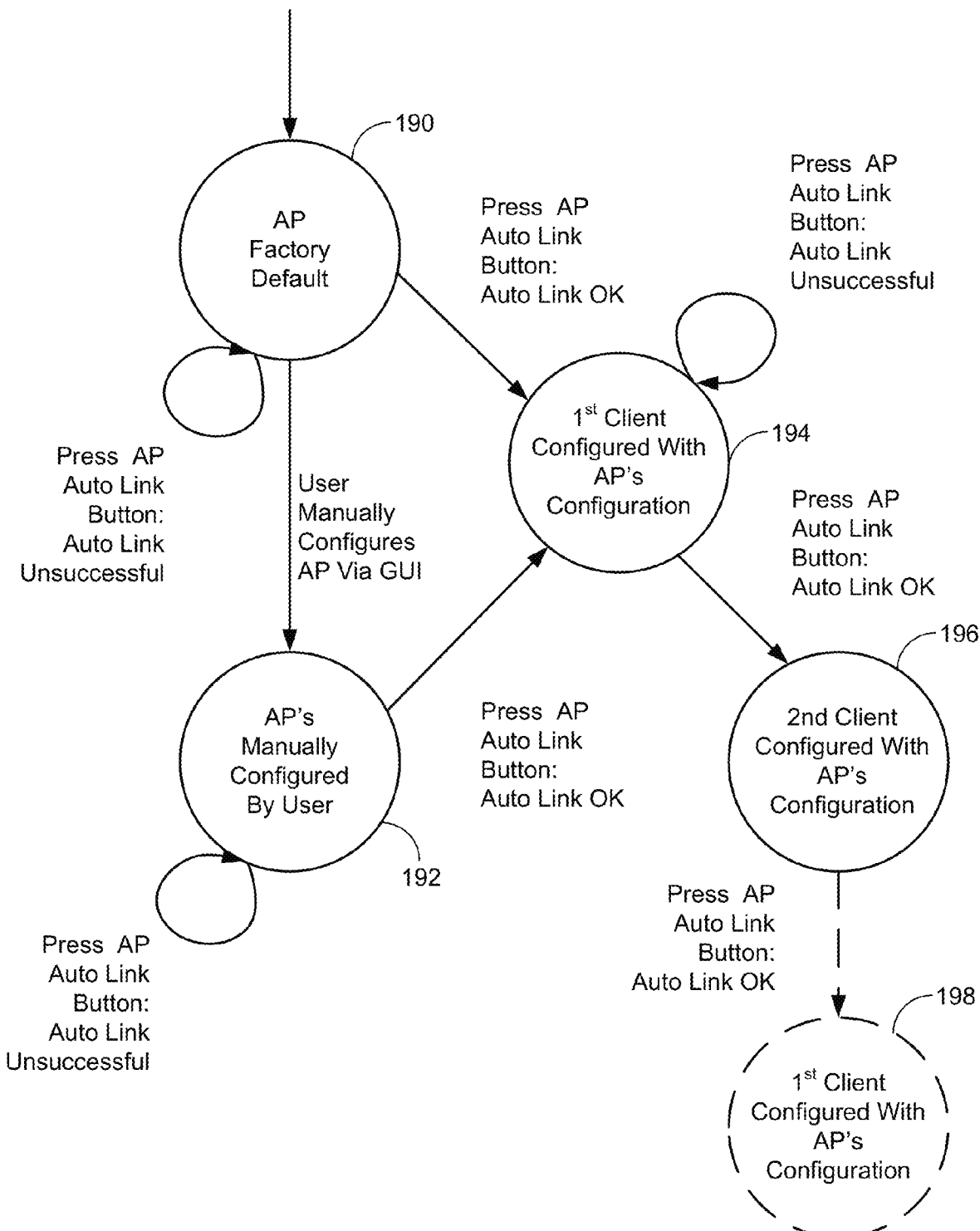
FIG. 1A is a state diagram describing various stages for adding client devices in a communication system.

In the following description, various implementations of the invention will be described. However, it will be apparent to those skilled in the art that the implementations may be practiced with only some or all aspects of the present invention. Techniques and requirements that are only specific to certain implementations should not be imported into other implementations. For purposes of explanation, specific numbers, materials and configurations are set forth in order to provide a thorough understanding of the implementations. These are, of course, merely examples and are not intended to limit the invention from that described in the claims.

In one implementation, a distributed real-time software application is provided, which allows simple, secure, and flexible association between various clients and access points (APs) in a home or small/office-home/office (SOHO) environment. Use in other environments is possible. The application is suitable for implementation in all types of wireless local area network (WLAN) devices, ranging from full-function personal computers to simple consumer electronics devices, especially those with limited user interface capabilities. While reference is made to a distributed real-time software application, other methods for implementing the processes, methods, apparatus and systems described below are possible. For example systems, apparatus, methods and processes described herein can be implemented in hardware, software or combinations of both.

In one implementation, an access point supports up to 2 levels of access (Simple and Authenticated Access, discussed below), and a client uses a specific level of access for requesting connection. In some implementations, standards, such as IEEE 802.11(a)-802.11(j), 802.11(n) and other industry standard security algorithms, are used in exchanges, handshakes and WPA-PSK/WPA2-PSK signaling mechanisms. In one implementation, the application implements an association process that uses layer 2 packets to exchange configuration data between APs and clients.

In one implementation, the configuration packet format is IEEE 802.2-compliant with a Sub-Network Access Protocol (SNAP) header. For example, the protocol identification field in the SNAP header may contain 3 bytes representing an Organizationally Unique Identifier (OUI) and 2 bytes representing a product type (PT), as defined in Tables 1 and 2 below. In this particular example, the configuration packet includes a 6-byte destination address, 6-byte source address and 2-byte frame length. The configuration packet also includes a destination service access point (DSAP) field, a source service access point (SSAP) field, a control field, a SNAP header containing 3 bytes representing an OUI, 2 bytes representing a PT, a predetermined N-byte of data and 4 bytes representing a frame check sequence.

TABLE 1

| Packet Structure | |
| --- | --- |
| Destination Address | 6 bytes |
| Source Address | 6 bytes |
| Frame Length | 2 bytes |
| DAP | 0xAA |
| SSAP | 0xAA |

TABLE 1-continued

| Packet Structure | | | |
| --- | --- | --- | --- |
| Control | | 0x03 | |
| Protocol Identification: Marvell OUI | 0x00 | 0x50 | 0x43 |
| AutoLink Protocol type and Marvell Product Type | | 2 bytes | |
| Data | | N bytes | |
| Frame Check Sequence | | 4 bytes | |

TABLE 2

| Product Type and Version Values | |
| --- | --- |
| Auto Link Version Value | Product Description |
| 0x02 | AutoLink Protocol type (designated as (nn) in this 2 byte field) |
| Product Type Value | Product Description |
| 0x(02)00 | Access Point |
| 0x(02)01 | Client Card |
| 0x(02)02 | Universal Repeater |

In one implementation, the association process may be implemented as an embedded software application that provides a simple and intuitive method for setting up secure connections within an embedded WLAN. Initiating the process may include, from an end user perspective, pressing a button on a first device (e.g., Home Gateway), pressing a button on a second device (e.g., voice over internet protocol (VoIP) Phone), and awaiting successfully notification (e.g., LED or audible cues). In order to establish a secure WLAN connection among various devices including traditional WLAN devices (e.g., gateways and laptops) and embedded small form factor WLAN devices (e.g., cameras and cell phones), the process may generate channel information, SSID, encryption keys, and security protocols as will be discussed in greater detail below.

In another implementation, the association process includes two steps. The first step comprises setting up an association between a client and an AP, and the second step details a process in which subsequent clients are securely added to the same AP. FIG. 1A shows a state diagram for various stages of a process for adding client devices to a secure communication network.

More specifically, the default state 190 of the AP can be entered upon power up 190. The process can be initiated, either manually or automatically. If the process is unsuccessful, the AP can be maintained in the default state 190. Alternatively, the AP can be manually configured (e.g., by user using a graphical user interface) and enter a configured state 192. Again, the process can be initiated. From either the default or the configured state, a successful association can result in a configured client (configured client state 194). Subsequently, other clients can be added to a configured state (Subsequent configured clients 196 and 198) linking either through the initial client or directly to the AP or other configured client. A process for individually configuring a client is discussed in greater detail below.

Figure 1B:
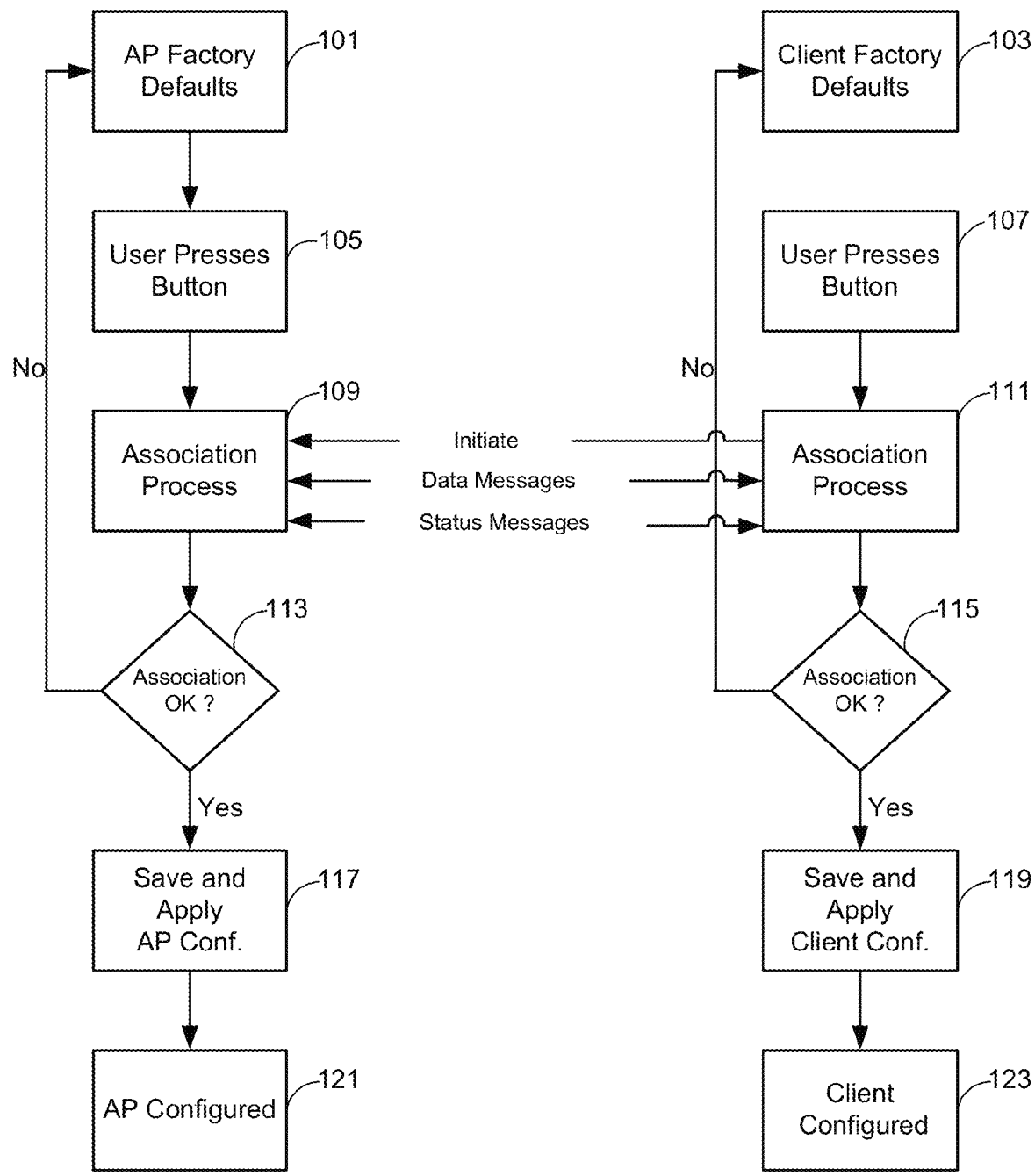
FIG. 1B is a flow diagram illustrating an exemplary configuration process.

Referring to FIG. 1b, a process is shown for configuring a client and access point for secure communication. Each of the access point and the client are configured upon power up with factory default settings (steps 101 and 103 respectively). A user can invoke the process by activating a device (e.g., a button) on the access point 105 and the client 107. In a particular implementation, the client includes a button or other activation device, in hardware or software, or combination thereof, which initiates the association process (e.g., generates an initiation event to client firmware). A user can activate the button in a predetermined pattern. The pressing of the button or input of the pattern initiates a handshake between the client and AP. Exemplary patterns to generate an activation event include pressing the button once, pressing the button multiple times or pressing and holding down the button for a period of time. Similarly, the access point can include a button or other activation device, in hardware or software, which signals the initiation of the process to the client.

Once the process is initiated, data and status messages are exchanged as part of an association process (steps 109 and 111). More specifically, as part of the association process, a Lifeline key for securing a negotiation between the AP and the client, and an operational key for entering an operational phase are established. The Lifeline key can be a symmetric key used to both encrypt and decrypt information. The operational key can also be a symmetric key that is used to both encrypt and decrypt information. In one implementation, one or both of the Lifeline key or operational key is unique to each AP-client pair. The specific details of the generation of the Lifeline key and the operational key are discussed in greater detail below.

After the Lifeline key is generated and the association is complete, the client receives setting information associated with the AP (e.g., SSID, channel number and security settings). In one implementation, the client presents a setting request to the AP, and the AP replies by sending its operational key, SSID, and channel number. In order to guard against spoofing, this information is encrypted by the Lifeline key. The client decrypts the received information (e.g., using the same Lifeline key previously generated). The client can then use this information to associate with (e.g., decrypt further communications using the operational key) the AP using the received operational key. If the process is successful (e.g., the operation key and other settings information have been received and acknowledged) (steps 113 and 115), the AP and client apply and save their respective settings and configurations (steps 117 and 119). Thereafter, configuration in the AP and client is complete (steps 121 and 123).

Figure 1C:
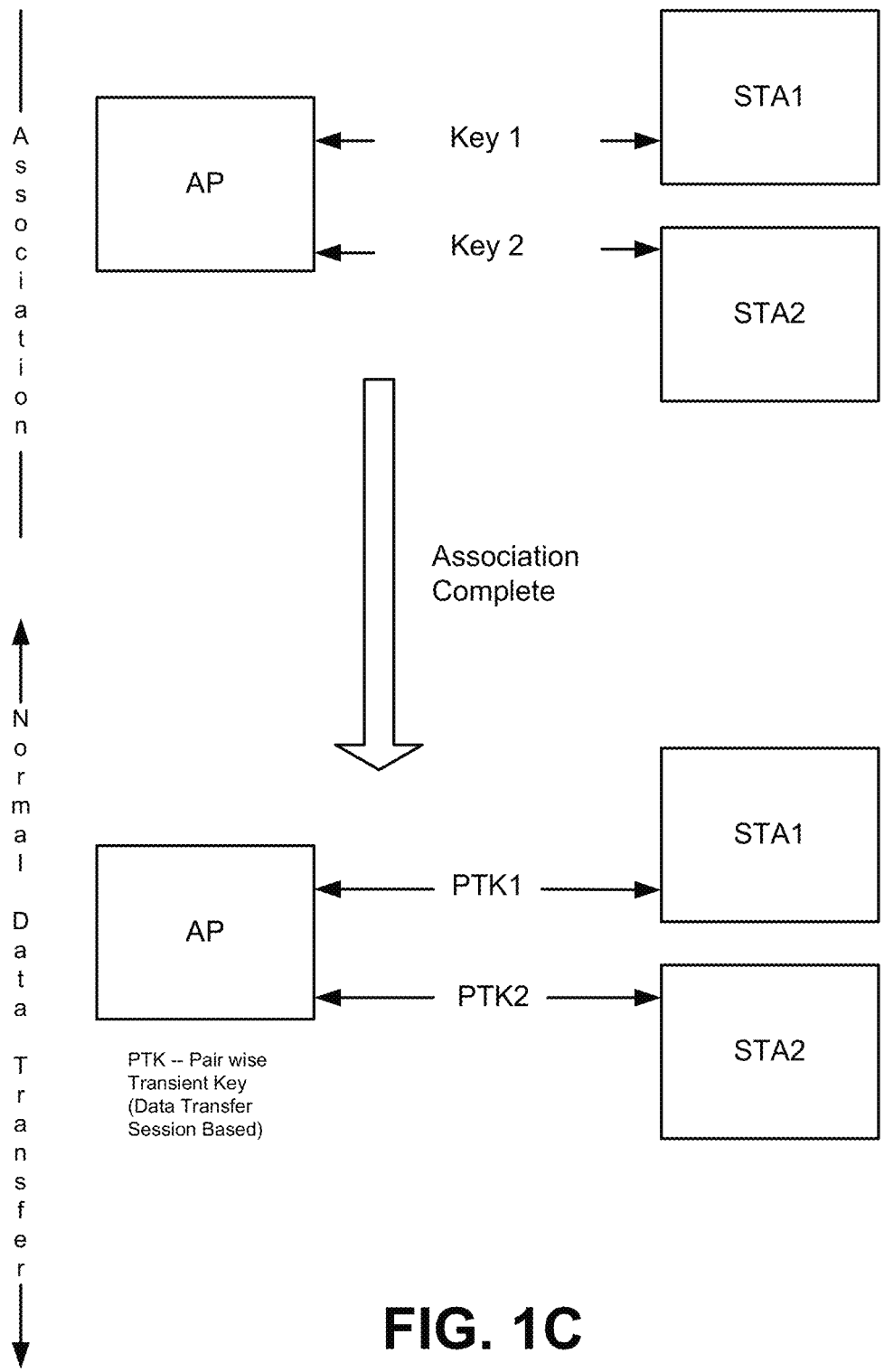
FIG. 1C is a flow diagram illustrating a relationship between keys and PTK keys used after configuration is complete.

FIG. 1C is a flow diagram illustrating a process after configuration is complete. Referring to FIG. 1C, in one implementation, after the process has been completed in both the AP and client using an operational key and Lifeline key (Key 1), data transfer in each AP-to-client session can be performed by deriving a Pairwise Transient Key (PTK1) that is unique to each AP-to-client session. This unique key can be divided into several encryption keys for use by an AP and a client as temporal session keys for IEEE 802.11i robust security, and can be generated using conventional techniques, for example, by concatenating a Pairwise Master Key (PMK), AP nonce, STA/client nonce, AP MAC address and STA/client MAC address. The concatenated result can then be operated on using a cryptographic hash function.

One advantage of the process is that the configured client device(s) do not get interrupted or disconnected from the AP while additional client devices are configured and added. For example, when a second client (STA2) wishes to enter the network, the second client sends a message to the AP without interrupting other configured sessions. During the sign-on process, a Lifeline key (Key 2) different from that used to configure the first client (Key 1) is generated between the AP and the second client. Upon successful authentication, the AP transmits an operational key and other operational information encrypted with this new Lifeline key to the second client. The second client decrypts this information and uses it to complete the process. After the process is complete, a second set of PTK (PTK2) different from a first set of PTK (PTK1) is issued during the session exchanges between the second client and the AP. Discussion of the key generation process is provided in further detail below.

Usage Models

The flexibility and security of the process allows the system to support a wide range of Home/SOHO usage models, which may include, but are not limited to, home and SOHO Wi-Fi network, WPA-personal or WPA-2 personal, auto-link-capable stations or legacy stations, open and WEP-only modes, and guest access. The process can advantageously be used in infrastructure mode IEEE 802.11 networks, and may also be extended to function in ad-hoc networks.

Figure 1D:
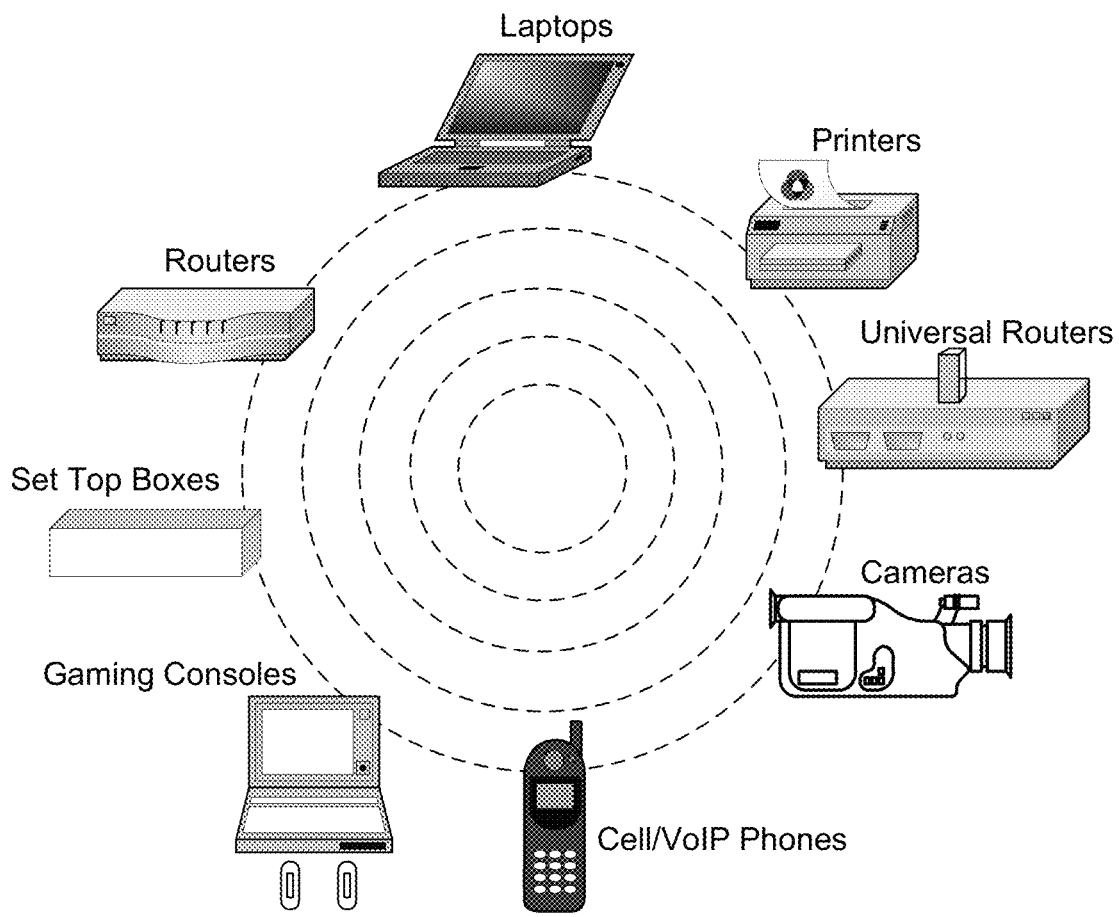
FIG. 1D is a diagram showing various devices that can be instrumented to support configuration in an Home/SOHO network.

As shown in FIG. 1D, devices that can be instrumented to support the process in an Home/SOHO network may include access points and routers, universal repeaters, personal computers, personal computer peripherals (e.g., printers, network storage, etc.), consumer electronics devices (e.g. DVD, digital cameras, TV, Digital Media Adapters and MP3 players), wireless telephones (Cellular & Wi-Fi telephones), and game consoles and personal digital assistants (PDAs). The association process can include two different modes of security.

In one implementation, a network can be configured to enable devices in one mode or the other, and devices with lesser security may not be permitted access to a given network. Simple Access allows for one level of security access control with some attending risk, since individual authentication is not required. Authenticated Access, on the other hand, provides for separate authentication prior to entry into the operational phase as will be discussed in greater detail below. In one implementation, Guest Access can be provided. The exact conditions for such entry are dependent upon the specific application and design, as will be discussed in greater details below.

Initiation of the Association Process

The process begins with an initiation process. In one implementation, the client includes a button or other activation device, in hardware or software, or combination thereof. In one implementation, only the client can initiate an association. A user can activate the button in a predetermined pattern to signal the initiation to the AP.

Operation

Association between an AP and an client occurs in several phases, as illustrated in FIG. 3 including an initialization phase 302, a passport control phase 304, a passport authenticate phase 306 and an operation phase 308. In one implementation, in the initial passport control phase 304, association is initialized using a pair-specific Lifeline key (sometimes referred to herein as the VISA key) and an AP-specific SSID (ASSID) as is discussed below. If Simple Access is chosen, an unauthenticated Simple Handshake is performed. Alternatively, if Authenticated Access is selected, a Secure Handshake with Password-based Authenticated Key Exchange (PAKE) is, by default, executed during the passport authenticate phase 306. After a successful handshake (either authenticated or otherwise), an operational key is established for use in the operational phase 308, in which association is authenticated using the operational key and the ASSID.

In one implementation, security mechanisms employed during the passport control phase 304 and the operational phase 308 may include WPA-PSK by default or WPA2-PSK. The ASSID retrieved in the passport control phase 304 and required for the operational phase 308 may contain a data format having a SSID and a MAC address. In one example, if the SSID is "Marvell AP" and the MAC address is "00:50:43:AA:BB:CC," then the corresponding ASSID is "Marvell-005043AABBCC." Optionally, if multiple-SSID capability is supported, the associated AP can be configured with guest SSIDs for guest access and other operational parameters for the additional basic service set (BSS) operating under each guest SSID.

The association process, as discussed earlier, can include two access modes; namely, Simple Access and Authenticated Access. Depending on applications, a client device can, in one implementation, have a capability of choosing one or both modes, and indicate the chosen mode in an association request message initially transmitted to the AP during for example the initialization phase 302. Similarly, in one implementation, the AP can choose from among one or both modes, and can advertise the available modes in a probe response message sent to a probing client.

Examples of Simple Access client devices can include, but are not limited to, a gaming controller connected to a game console, a camera device connected to a home printer, a cordless intercom without keypad & display, digital media players with minimal GUI (e.g., iPod Shuffle), and guest network devices for general internet access.

Examples of Authenticated access client devices include, but are not limited to, portable game consoles connecting to a game coordinator to download games, personal computers, laptops, cordless phones with keypad & display, digital media players with rich GUIs (e.g., for downloading from a media gateway), camera devices connecting to a SOHO office printer and other information processing equipments such as PDAs.

Optionally, an AP can simultaneously support both modes by supporting multiple infrastructure BSSs. For example, while a Authenticated Access-enabled BSS can be used for laptop access, a Simple Access-enabled BSS may function as a guest network for printing or operations related to gaming. Each BSS operates with a unique operational key and may be segregated from one another for security reasons.

In one implementation, the association process allows a client to specify the access mode it supports, and to discover the access mode(s) an associated AP (i.e., BSS) operates in. This provides the client or an end user a selection of networks in which it may be associated. For instance, a laptop which normally selects Authenticated Access may choose to connect to a guest network using a Simple Access process, or a headless device supporting only Simple Access may choose to join a BSS that is Simple Access-enabled.

Figure 4A:
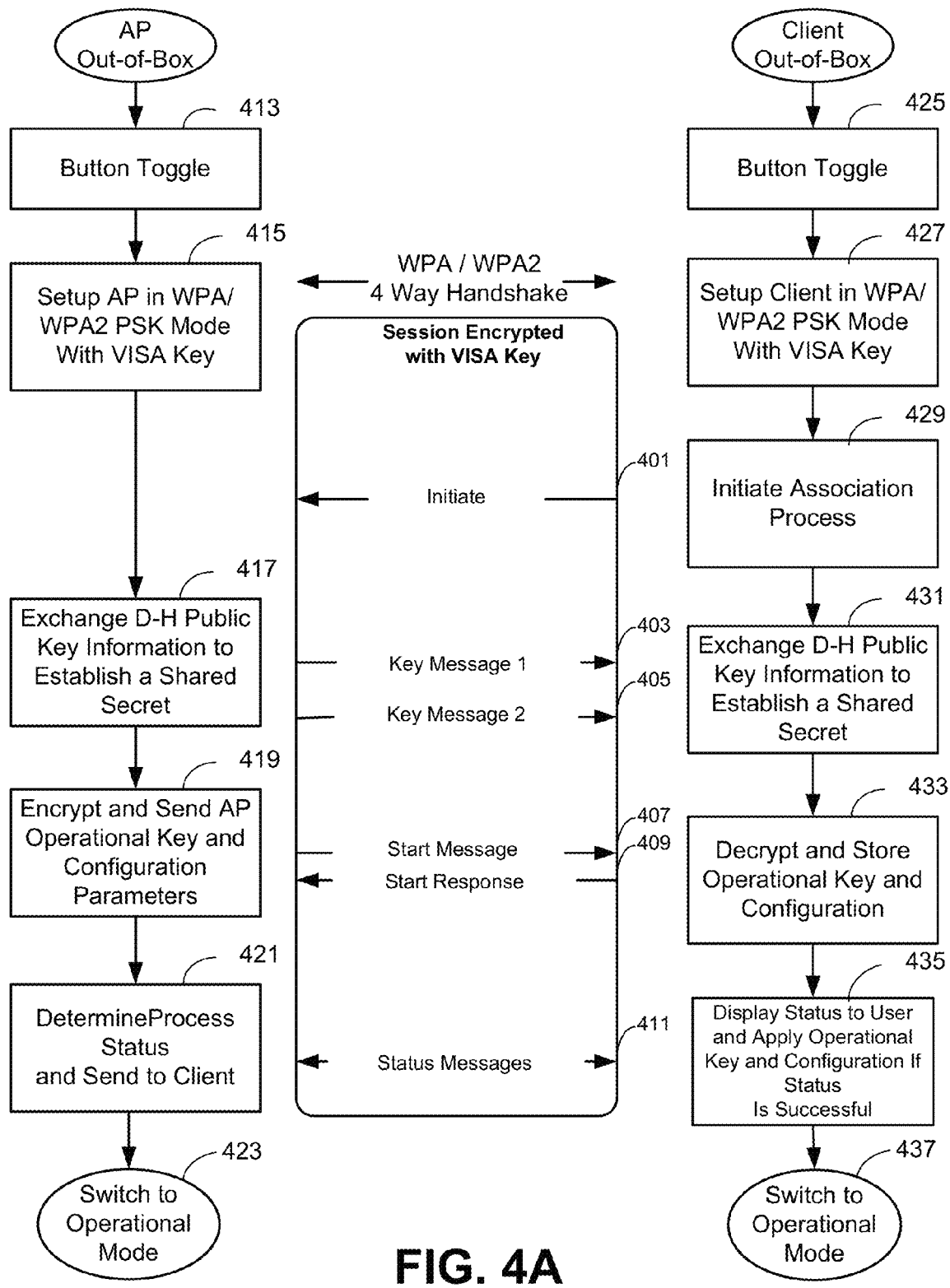
FIG. 4A is a flow diagram of an exemplary Simple Access process for associating a client with an AP.

FIG. 4A is a flow diagram of an exemplary Simple Access process for associating a client with an AP. Specifics with respect to the AP and the client will be discussed in relation to FIGS. 4B and 4C, respectively.

In the Simple Access process, authentication may include pressing and releasing buttons on both the AP and the client (413-425), toggling the button on the AP to broadcast a probe response containing an information element, and toggling the button on the client to locate an AP based on the information element received in the probe response and on the AP's received signal strength indicator (RSSI). One skilled in the art will recognize that the invention is not limited by the order the buttons are pressed or toggled, and should appreciate that the Simple Access process can be initialized by toggling the buttons on the AP and client in an arbitrary order, or only toggling buttons on one of the devices.

In one implementation, the information element included in the probe response frame beacons and sent by the AP may contain a format defined in Tables 3 through 8.

TABLE 3

Format of Information Element

| 1 byte | 1 byte | 3 bytes | 1 byte | 1 byte | 1 byte | 2 bytes |
|---|---|---|---|---|---|---|
| IE_ID = 221 | Length | OUI = 0x00:0x50:0x43 | OUI_Type | OUI_Subtype | Version | Info |

TABLE 4

Fields in Information Element

| Field | Size | Description |
|---|---|---|
| IE_ID | 1 | IE identifier, set to 221 |
| Length | 1 | Length of IE excluding IE_ID and Length field |
| OUI | 3 | Organizational Unique Identification field, set to 0x00:0x50:0x43 |
| OUI_Type | 1 | Type of Information Element |
| OUI_Subtype | 1 | Subtype of Information Element |
| Version | 1 | AutoLink version number |
| Info | 2 | AutoLink Information field |

TABLE 5

OUI Type Values

| OUI_Type Value | Description |
|---|---|
| 0x02 | AutoLink Information Element |

TABLE 6

Subtype Values

| AutoLink Subtype Value | Description |
|---|---|
| 0x00 | Access Point Information |
| 0x01 | Client Device Information |

TABLE 7

Version Values

| AutoLink Version Value | Description |
|---|---|
| 0x02 | AutoLink version number |

TABLE 8

Information Field Values

| Field | Size (bytes) | Description |
|---|---|---|
| Status | 1 | Current setup status: bit field |
| | | Bit  Description |
| | | 0  Configured with default Factory settings |
| | | 1  Configured via AutoLink |
| | | 2  Manually configured by User via GUI |
| | | 3:7  Reserved |

TABLE 8-continued

Information Field Values

| Field | Size (bytes) | Description |
|---|---|---|
| Capability Info | 1 | Access Point Capabilities: bit field |
| | | Bit  Description |
| | | 0    Support WPA |
| | | 1    Support WPA2 |
| | | 2    Support Simple Access |
| | | 3    Support Authenticated Access |
| | | 4:7  Reserved |

In one implementation, a client initially attempts to associate with APs advertised in the received information element first and then with APs having the greatest RSSI. To provide flexibility, in one implementation, transmit power of an AP may be adjusted prior to or during handshake and not immediately after toggling the button so that a client can accurately locate a desired AP based on RSSI.

After successfully locating and associating with a selected AP, the client proceeds to negotiate a security policy, which in one implementation, can either be WPA or WPA2-based (415, 427). As discussed earlier, in the passport control phase (e.g., 304), a pair-specific VISA key can be used as a Lifeline key to execute an association between an AP and a client. This VISA key may be generated during an initialization stage (step 401), and the AP and the client can negotiate with each other on a secured WPA/WPA2 session using this VISA key. In one implementation, the VISA key is used as a Pairwise Master Key (PMK) during the passport control phase 304 of FIG. 3.

Once an association has been linked, the client initiates a handshake via an key message exchange (steps 403 and 405) with the AP including exchanging a key message containing, in one implementation, an asymmetric Diffie-Hellman key exchange sequence to establish a shared secret (417, 431). The shared secret is then used to encrypt an operational key using, for example, a National Institute of Standards and Technology Advanced Encryption Standard (NIST AES) key wrap.

Specifically, in one implementation, the AP encrypts the operational key using the shared secret derived from the Diffie-Hellman key exchange and the NIST AES key wrap algorithm. The NIST AES key wrap algorithm can be the same as that used to protect key data fields based on 802.11(i) standard. The Internet Engineering Task Force Request for Comment (IETF RFC) 3394, the disclosure of which is incorporated herein by reference, can be used to define the NIST AES key wrap algorithm. The shared secret can be established as described in the Diffie-Hellman public key algorithm. A simplification of the public key algorithm is discussed below.

Let two parties A and B agree on large prime numbers "p" and "g" such that "g" is primitive mod "p." These two integers "p" and "g" are not secret and may be agreed upon using an insecure channel. A chooses a random large integer "x" and sends B "$X_A = g^x$ mod p," while B chooses a random large integer "y" and sends A "$Y_B = g^y$ mod p." Upon receipt, A computes "$K_{AB} = Y^x$ mod p," and B computes "$K_{AB} = X^y$ mod p," and both A and B determine if respective $K_{AB}$ equals to "$g^{xy}$ mod p."

Using the Diffie-Hellman public key distribution system, if A wants to send a message "m" to B, where "$0 \leq m \leq p-1$," A chooses a random number "k," such that "k" is relatively prime to "p−1." Then, A computes a key "$K = Y_B^K$ mod p," to encrypt a message pair ($c_1$, $c_2$), wherein "$c_1 = g^k$ mod p," and "$c_2 = Km$ mod p." To decrypt the message pair, B first recovers K, where "$K = (g^k)^y = c_1^y$ mod p," and divides $c_2$ by K to recover the message "m."

Alternatively, the shared secret can be generated by the use of push buttons on the respective devices. If a client is equipped with only a push-button, an AP can generate a random personal identification number (PIN) and convey the PIN to the client based on the flashing pattern of a LED on the AP. The random PIN generated by the AP generally can be a randomly-chosen positive integer. In one implementation, the PIN represents the number of seconds the LED is in an ON state. In one implementation, the PIN is restricted to values of 3, 7, 11 or 15.

Figure 2A:
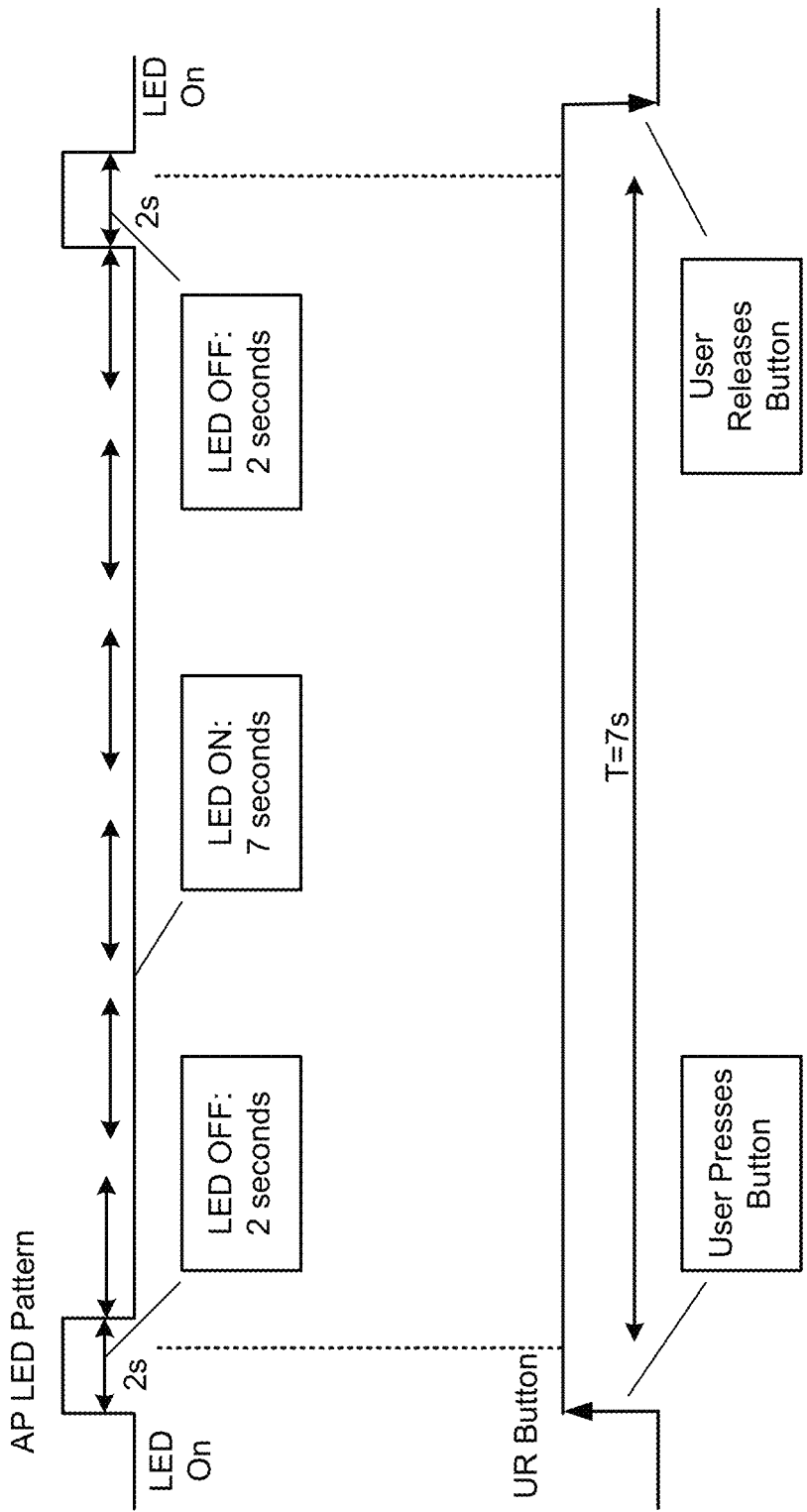
FIG. 2A illustrates a first method for generating a random PIN and conveying the PIN to a client.
Figure 2B:
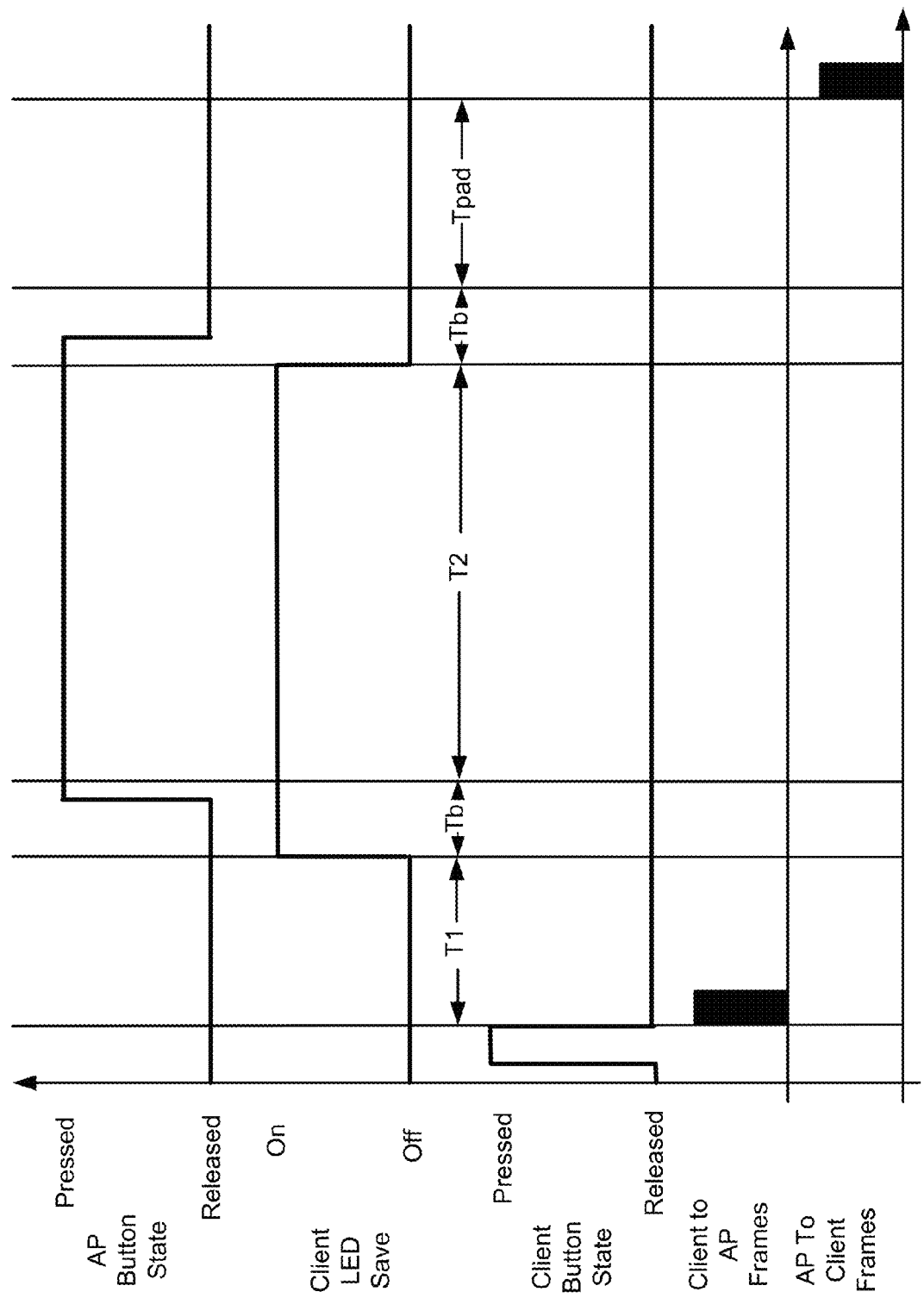
FIG. 2B illustrates a second method for generating a random PIN and conveying the PIN to a client.

As shown in FIG. 2A, the random PIN is set at 7, and the LED remains ON for seven seconds. At the end of 7 seconds, the LED turns OFF after a blinking period of 2 seconds. When the process is initiated via an GUI, the AP determines the random PIN, and turns ON the LED for the prescribed time period (e.g., 7 seconds). To facilitate the ease of interacting with the user (who may or may not have a time piece to time the pattern), the system can repeat the pattern and the user of a client device can match the pattern (depressing the button on the client device when the client sees the AP LED turn on and release the button when the AP LED goes off) to initiate the process. Alternatively, an user can be required to press the push button at the time interval indicated by the PIN, instead of pressing and holding the push button for a time duration equal to the PIN. This exemplary method is illustrated in FIG. 2B.

First, a sending device internally generates a random PIN, which may be a positive N-bit value. Let the N-bit value represented by bits [N/2−1,0] be denoted by T1 and the N-bit value represented by bits [N−1, N/2] be denoted by T2. For example, for N=8 and PIN value of [10100011] (i.e., base 2), T1=[0011] (base 2)=3 (base 10) and T2=[1011] (base 2)=11 (base 10).

Upon pressing a button (e.g., a button on an access point, a button on a client device, or other button e.g., a "Play" button on a MP3 player), the sending device generates a message to the receiving device to signal the start of the process. Then, the sending device waits for a duration of T1 seconds before setting a LED on the sending device to ON state. The sending LED turns OFF after an additional duration of T2 seconds. On the receiving device, after receiving an initial message from the sending device, the user presses a button (e.g., a button on a media gateway AP) upon turning ON the LED. Then, the user holds the button until the LED turns OFF again. In this example, the receiving side acquires the values of T1 and T2 that are spaced sufficiently apart at quantized values (e.g., 1, 3, 7, 11 or 15) so as to reduce any ambiguity during observation.

To allow for delays related to human reaction, a fixed buffer time of $T_b$ seconds is added to both T1 and T2. After the receiving device has acquired both T1 and T2, a PIN value is determined that can be used by both the sending device and the receiving device to mutually authenticate each other. The authentication steps that follow start after a configurable delay of $T_{pad}$, and are typically accomplished over a wireless channel using additional messages.

In one implementation, given that the PIN is regenerated for every session, and the session is aborted when a false PIN is detected, the possibility of success for unauthorized access is kept minimal. Further, because an adversary attempting to acquire a PIN value from sniffing the over-the-air traffic can only surmise an upper bound for the value T1+T2 based on the delay between two over-the-air messages, the value of $T_{pad}$ delay can be chosen so that the elapsed time between two over-the-air messages is constant regardless of the value T1+T2.

Although a method of pressing and holding a button is illustrated, as described above, one of ordinary skill in the art would recognize that one can achieve the foregoing objective by toggling a switch or manipulating the number of times the button is pressed. A hardware button need not be used, and can be replaced with a software button or a remote control. Also, audible cues can also be used in place of the LED.

Upon authentication and completion of the key message exchange phase, a start message exchange (steps 407 and 409) commences including the sharing of an operational key between the AP and the client (419, 433). It should be recognized that other operational parameters and information such as Dynamic Host Configuration Protocol (DHCP) and Internet Protocol (IP) address also may be shared in these exchanges.

Upon verification of the operational key, the client and the AP enter the operational phase (step 421, 435), and can exchange status messages as required (411). The operational key may be derived using a function that hashes various AP unique inputs and generates a pseudo-random value. To increase the randomness of the operational key, a timestamp may be used as one of the unique inputs. In one implementation, the operational key for entry into operational phase may be of the following format:

(PRF-128 Random number, "Operational Key", AP MAC Address||Current Timestamp);

wherein 128 bits (16 bytes) of the operational key derived from Pseudo-Random-Format 128 (PRF-128) are stored as ASCII Hexadecimal; that is, each byte of the hexadecimal operational key is coded as an ASCII character resulting in 32 bytes of ASCII hexadecimal representation. This 32-character operational key can be used as WPA pass-phrase in normal WPA operation mode between the AP and client. For extensibility, the pass-phrase also can be used as a WPA2 pass-phrase in a WPA2 mode depending on the security modes the AP and client can support.

In one particular example, the operational key is derived once per session and will not change subsequently unless a user resets an AP to default and initiates another session with a client. In one implementation, the SSID of an AP is not changed or modified during the process to prevent any existing client(s) from disconnecting an associated AP. In another implementation, the AP logs the MAC address of each client to which it is associated. One advantage of this feature is to keep track of and guard against any rogue client during a session.

Figure 4B:
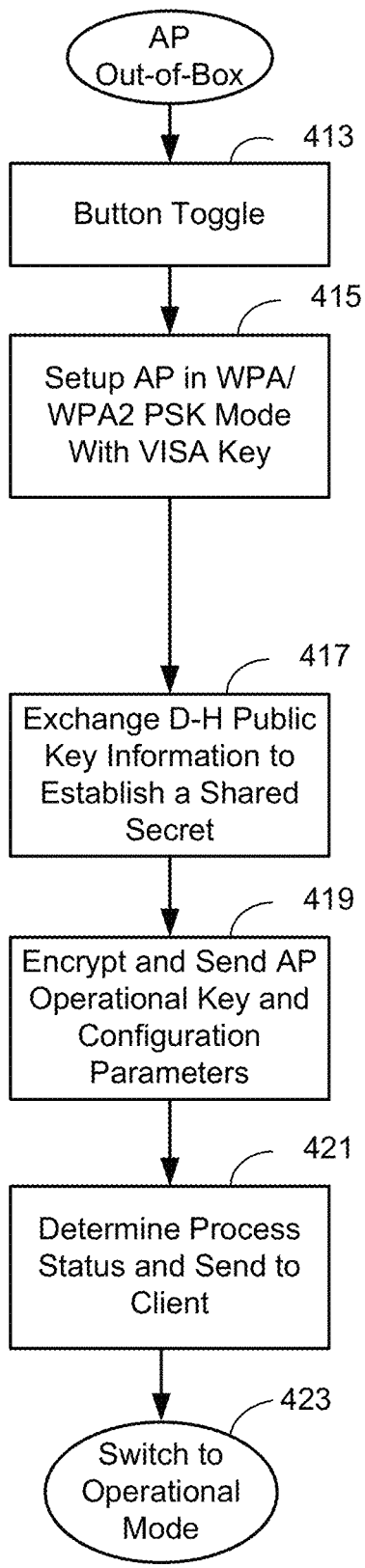
FIG. 4B is a flow diagram of an exemplary Simple Access process from an AP perspective.

FIG. 4B is a flow diagram of an exemplary Simple Access process from an AP perspective. First, after toggling a button (step 413), either in physical or GUI form, an out-of-the box AP awaits a probe request or association request from a client. Once a probe request or association request has been received, the AP responds by advertising its capability through a probe response containing an information element. The selected AP then transmits its unique ASSID to the client which distinguishes it from other APs, and generates a VISA key to enter the passport control phase (step 415). As discussed earlier, the VISA key can be of the form of a client-specific WPA-PSK or WPA2-PSK PMK used to establish a secure WPA/WPA2 session, as the AP may only permit clients with a valid VISA key for association. The AP then participates in an handshake upon receiving an initiate message from the client. The initiate message may contain a format defined in Table 9 below.

TABLE 9

Initiate Message

| Field | Size (bytes) | Description |
| --- | --- | --- |
| CmdCode | 2 | ALCMD_INITIATE |
| Size | 2 | Number of bytes in the body |
| SeqNum | 2 | The sequence number assigned by the sender |
| Result | 2 | Execution result, not used, set to zero |

In particular in one implementation, during the handshake, the AP initiates a key exchange (including an asymmetric Diffie-Hellman asymmetric key exchange as described above or other methods for sharing a secret) to establish a shared secret (step 417). Following completion of the key exchange, an operational key is securely generated to start message exchange. A start message is sent from an AP to a client with configuration information required by the client to associate with the AP (step 419). An example of a format for key messages, a start message and a response as acknowledgement from the client is set forth in Tables 10a,b-11a,b, respectively. In one implementation, transmit power at which start and response messages are transmitted may be adjusted so as to protect the messages from being sniffed through a wireless medium.

Key Message 1

The Key Message 1 is sent from AP to Client containing the Diffie-Hellman Public Key value $X=g^x$ mod n. The message format is as follows:

TABLE 1

Key Message 1

| Field | Size (bytes) | Description |
| --- | --- | --- |
| CmdCode | 2 | ALCMD_KEY | 0x8000 |
| Size | 2 | Number of bytes in the body |
| SeqNum | 2 | The sequence number assigned by the sender |
| Result | 2 | Command execution result, set to zero |
| Public Key Value | 128 | Public Key value |
| Group Index | 2 | Index to the Generator and Prime group |
| Reserved | 2 | Reserved for future use |

Key Message 2

The Key Message 2 is sent from Client to the AP containing the Diffie-Hellman Public value $Y=g^y$ mod n. The message format is as follows:

TABLE 10B

Key Message

| Field | Size (bytes) | Description |
| --- | --- | --- |
| CmdCode | 2 | ALCMD_KEY |
| Size | 2 | Number of bytes in the body |
| SeqNum | 2 | The sequence number assigned by the sender |
| Result | 2 | Command execution result, set to zero |
| Public Key Value | 128 | Public Key value |
| Group Index | 2 | Index to the Generator and Prime group |
| Reserved | 2 | Reserved for future use |

TABLE 11a

Start Message

| Field | Size (bytes) | Description |
| --- | --- | --- |
| CmdCode | 2 | ALCMD_START \| 0x8000 |
| Size | 2 | Number of bytes in the body |
| SeqNum | 2 | The sequence number assigned by the sender |
| Result | 2 | Execution result, not used, set to zero |
| CfgPassword | 64 (72 bytes when AES encrypted) | AES Encrypted Operational Key: 32 byte WPA Pass Phrase WEP 64 or WEP 128 Key |
| CfgPassword-WPA2 | 64 (72 bytes when AES encrypted) | AES Encrypted Operational Key: 32 byte WPA2 Pass Phrase |
| SecurityMethod | 2 | 0x0000: No encryption 0x0001: WPA-TKIP encryption 0x0002: 64 bit WEP encryption 0x0003: 128 bit WEP encryption 0x0004: WPA-AES encryption 0x0005: WPA2-AES encryption |
| Index | 2 | WEP key index |
| IPAddressOption | 2 | 0x0001: Fixed IP address 0x0002: DHCP |
| Current AP IPAddress | 4 | Set to 0.0.0.0 if IPAddressOption is DHCP. Set to current AP's IP address if IPAddress-Option is Fixed IP Address. |
| AP Channel | 2 | AP's current channel |
| AP's SSID | 32 | AP's current SSID, null terminated |
| MAC Address | 6 | AP's MAC address |
| Group Re-key Timeout | 4 | Group Re-key timeout for WPA/WPA2 |

TABLE 11b

Start Response

| Field | Size (bytes) | Description |
| --- | --- | --- |
| CmdCode | 2 | ALCMD_START |
| Size | 2 | Number of bytes in the body |
| SeqNum | 2 | The sequence number assigned by the sender |
| Result | 2 | Command execution result |

In one implementation, the operational key may be derived using a function that hashes various AP unique inputs to generate a pseudo-random value. To increase randomness to the pseudo-random value, a timestamp may optionally be used as one of the unique inputs. One advantage of using a timestamp is that messages can be protected by a timer, and that the process can be enabled or disabled based on the protection timer that may be configured by end users.

While the foregoing describes only an operational key, those skilled in the art will recognize that other configuration parameters such as DHCP and IP address also can be exchanged. The AP may also maintain a list of client MAC addresses currently associated with the process to prevent rogue clients from initiating a session using one of the listed MAC addresses.

Next, the handshake is terminated during a Status Message exchange (step 421), and the AP and the client enter an operational phase using the operational key generated and the received SSID (step 423).

Figure 4C:
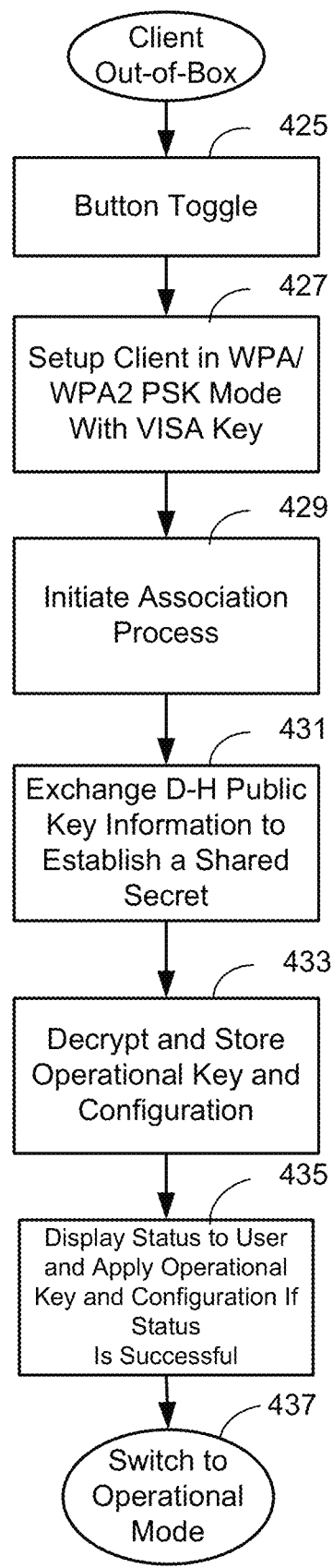
FIG. 4C is a flow diagram of an exemplary Simple Access process from a client perspective.

FIG. 4C is a flow diagram of an exemplary Simple Access process from a client perspective. As shown in FIG. 4C, after toggling a button (step 425), an out-of-the-box client actively searches for an AP based on a probe response containing an information element received from one or more APs. The information element can include the advertised security capability level of the AP (e.g., Simple Access, Authenticated Access, or Guest Access capability). If multiple APs are present, the client may select to associate with an AP based on the RSSI with respect to each detected AP. Alternatively, the client may attempt to establish an association with the AP(s) advertising a desired information element in the received probe responses first and then with the AP that has the highest RSSI. In one implementation, if the client fails to establish a connection with an AP advertised in the information element, the client may proceed to establish a connection with an AP having a highest RSSI.

Once a desired AP has been identified, the client associates with the selected AP by using a VISA key to enter the passport control phase (step 427). Again, the VISA key may be a PMK for establishing a secure WPA/WPA2 session, as the AP may be configured to only permit clients with a valid VISA key for association. If the client fails to enter passport control phase with the AP after a preset number of attempts, another AP is chosen, e.g., based on RSSI.

Next, the client initiates a handshake (step 429) using an initiate message and participates in an asymmetric key exchange (step 431). An operational key is also securely generated during the start message exchange, decrypted and stored by the client (step 433). The handshake is terminated during a Status message exchange (step 435), at which point the client enters the operational phase with the AP using the operational key generated and the received ASSID (step 437). An exemplary format of a status message containing a status request and a status response can be found in Tables 12 and 13, respectively. Similar to start messages, transmit power at which status request and response messages are transmitted may be adjusted so as to protect the messages from being sniffed through a wireless medium.

TABLE 12

Status Request

| Field | Size (bytes) | Description | |
| --- | --- | --- | --- |
| CmdCode | 2 | ALCMD_STATUS \| 0x8000 | |
| Size | 2 | Number of bytes in the body | |
| SeqNum | 2 | The sequence number assigned by the sender | |
| Result | 2 | Execution result, not used, set to zero | |
| Status | 1 | Status: | |
| | | Value | Description |
| | | 1 | Setup was successful |
| | | 0 | Setup failed |
| Action | 1 | End setup session or restart | |
| | | Value | Description |
| | | 0 | End session |
| | | 1 | Restart session |

TABLE 13

Status Response

| Field | Size (bytes) | Description |
| --- | --- | --- |
| CmdCode | 2 | ALCMD_STATUS |
| Size | 2 | Number of bytes in the body |
| SeqNum | 2 | The sequence number assigned by the sender |
| Result | 2 | Command execution result |

In one implementation, an end request message may be sent from an AP to a client to conclude a negotiation. An exemplary format of an end request message containing an end request and an end response can be found in Tables 14 and 15.

TABLE 14

End Request

| Field | Size (bytes) | Description |
| --- | --- | --- |
| CmdCode | 2 | TSCMD_END |
| Size | 2 | Number of bytes in the body |
| SeqNum | 2 | The sequence number assigned by the send |
| Result | 2 | Command execution result, not used, set to zero |
| CmdCode | 2 | ALCMD_END | 0x8000 |
| Size | 2 | Number of bytes in the body |
| SeqNum | 2 | The sequence number assigned by the sender |
| Result | 2 | Command execution result, not used, set to zero |

TABLE 15

End Response

| Field | Size (bytes) | Description |
| --- | --- | --- |
| CmdCode | 2 | ALCMD_END |
| Size | 2 | Number of bytes in the body |
| SeqNum | 2 | The sequence number assigned by the sender |
| Result | 2 | Command execution result |

In the Simple Access process, the use of Diffie-Hellman asymmetric key exchange provides protection against attacks such as passive monitoring, because in passport control phase, the operational key is protected by two layers of protection; namely, handshake takes place within the security provided by WPA-PSK or WPA2-PSK, and the operational key is encrypted using the shared secret derived, for example, from the Diffie-Hellman key exchange. The simple Access process provides adequate encryption against unauthorized access since the operational key cannot be reconstructed from a monitored public key exchange. Also, the Simple Access process provides protection against active/passive dictionary attacks, because the VISA key can be derived, for example, using PBKDF2, adding a salt to the password, while the operational key can be derived using randomly generated input. Further, due to the use of randomly generated secrets, the Simple Access process provides an advantage of detecting possible replay of packets occurred from one session in another.

Authenticated Access

Figure 5A:
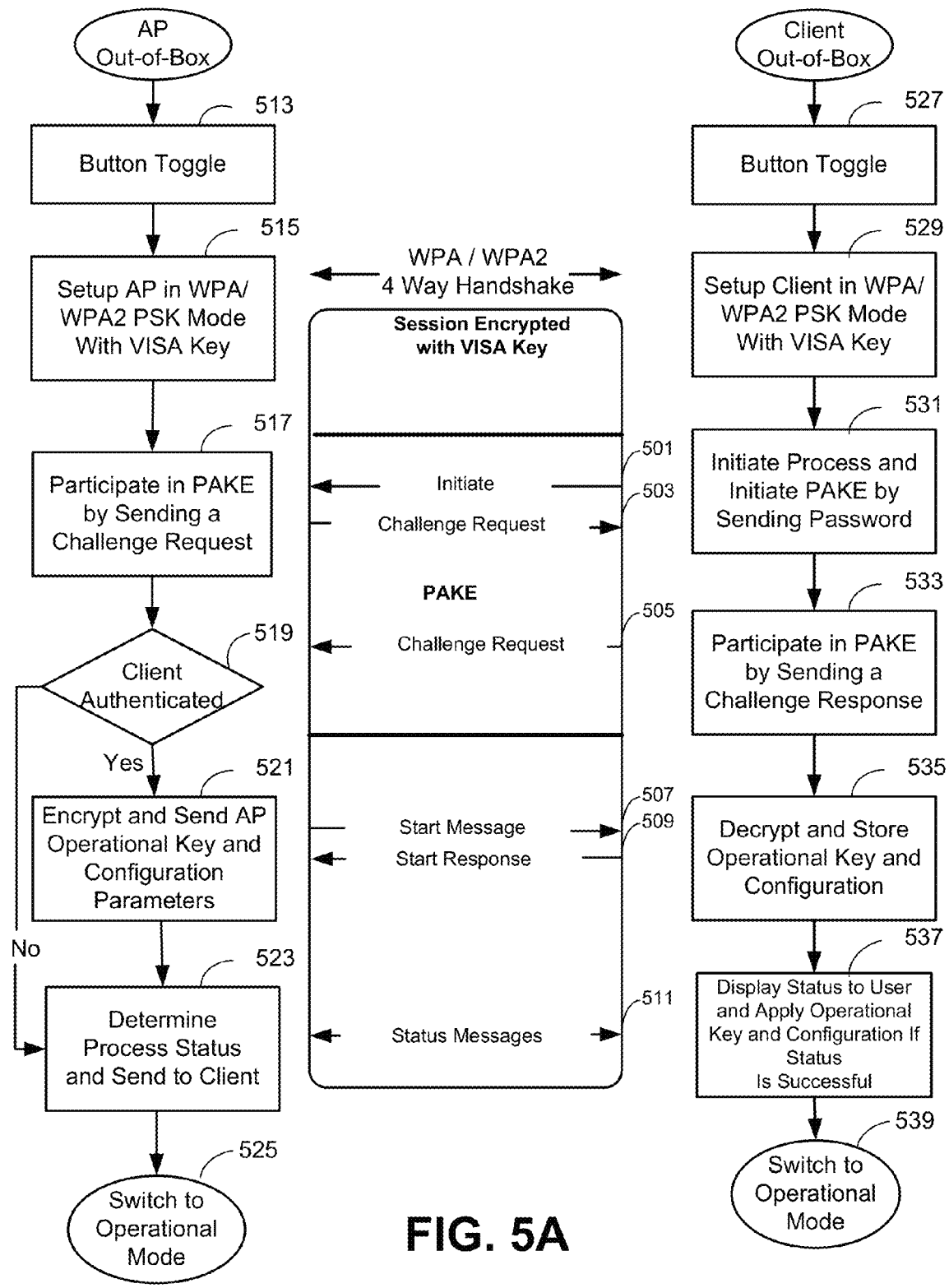
FIG. 5A is a flow diagram of an exemplary Authenticated Access process for associating a client with an AP.

FIG. 5A is a flow diagram of an exemplary Authenticated Access process for associating an AP with a client. Specifics with respect to the AP and the client will be discussed in FIGS. 5B and 5C, respectively.

In one implementation, similar to Simple Access process, a pair-specific VISA key is used to execute an association between an AP and a client. This VISA key may be generated during an initialization stage (step 501), and the AP and the client negotiate with each other (e.g., on a secured WPA/WPA2 session) using this VISA key. The Authenticated Access process typically contains the same number of frame exchanges as required in the Simple Access process.

However, unlike the Simple Access process, the Authenticated Access process contains a Challenge and Authenticate exchange (steps 503 and 505) that, in one implementation, is derived based on the Diffie-Hellman Integrated Encryption Scheme (DHIES). In one specific implementation, challenge frames used in the Challenge and Authenticate process are a fragment of a Three-Pass Password-based Authenticated Key Exchange (PAKE) protocol based on the Three-Pass Authenticated key agreement via Memorable Passwords (TP-AMP) protocol, an efficient protocol based on IEEE 1363.2 and 1363.3 standard ("Draft Standard Specification for Password-Based Public Key Cryptographic Techniques"), the disclosure of which is incorporated herein by reference.

Figure 6:
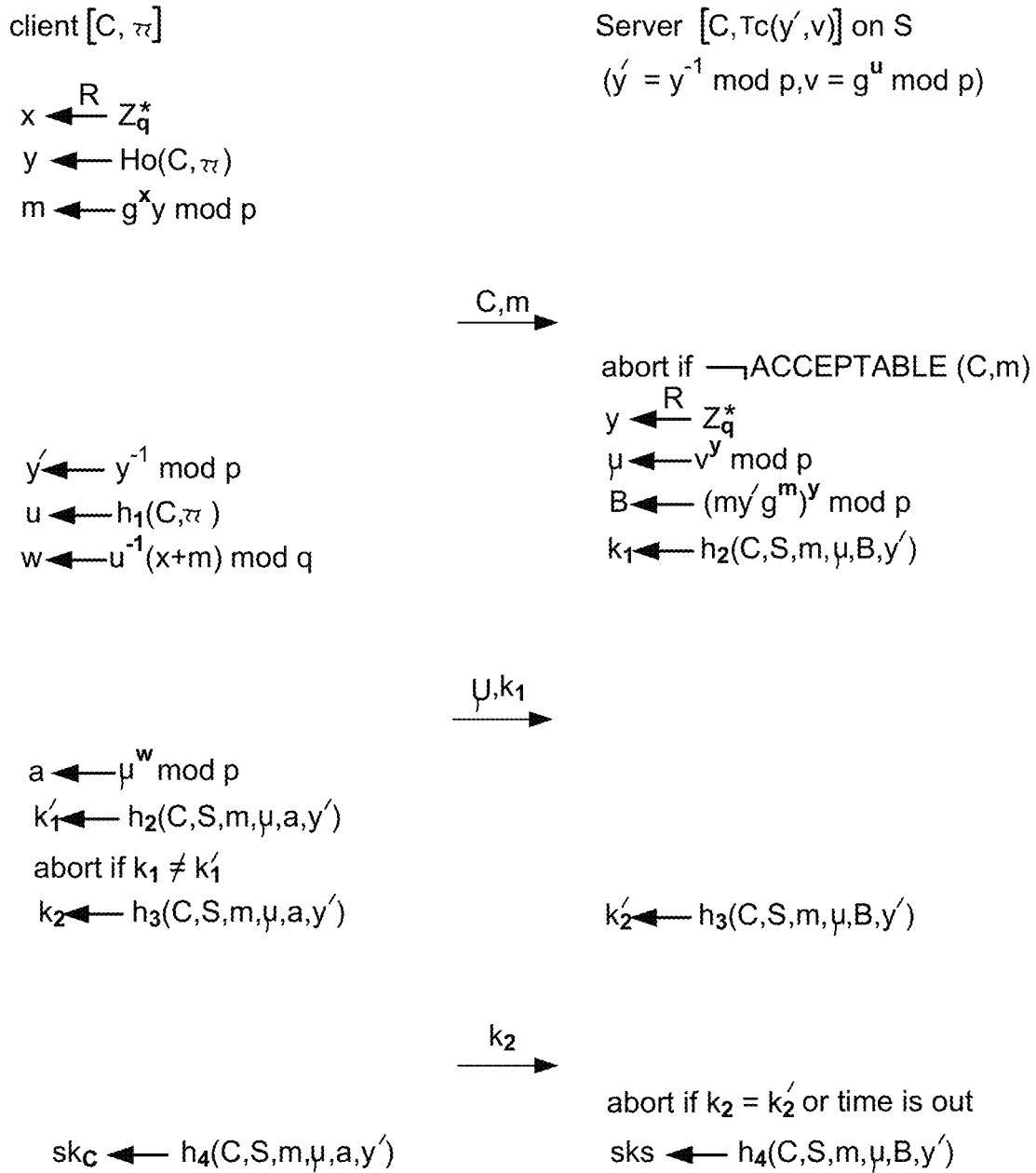
FIG. 6 illustrates an exemplary Password-based Authenticated Key Exchange (PAKE) process.

Pictorially, authentication steps using the PAKE protocol based on the TP-AMP protocol are illustrated in FIG. 6. The basic notations are assumed as follows:

C Client
$\pi$ password
$\leftarrow$ Derivation
$\kappa$, l security parameters: $\kappa$ can be 160 bits and l be 1024 bits
r integer co-prime to q
$Z^*_p$ Multiplicative group p
g, $\zeta$ Generator of $G_q$
$\alpha$, $\beta$ Agreed values
S Server
$\tau_C$ Transformed password for C
$\xleftarrow{R}$ Random Selection
q Prime of size $\kappa$
p Prime of size l such that p=rq+1
$G_q$ q-order subgroup of $Z^*_p$
$h_i$, $H_i$ Random oracles
$sk_i$ Session Key The AP and client are respectively considered as server S and client C in this example. In this exemplary illustration, client C and server S agree on Diffie-Hellman parameters p, q, and g. First, $\bar{G}_q=\{g^x \bmod p | x \in Z^*_p\}$ where $|\bar{G}_q|=q-1$ is defined. Let $\{0,1\}^*$ denote the set of finite binary strings and $\{0,1\}^n$ the set of binary strings of length n. Next, random oracles are defined such that $h_i: \{0,1\}^* \rightarrow \{0,1\}^\kappa$ and $H_i: \{0,1\}^* \rightarrow \{0,1\}^l$. Note that $H_i(\bullet)$ is a specific random oracle which outputs in a pre-defined subgroup ($G_q$) only. Their practical instances are defined as $h_i(\bullet)=h_i(i,\bullet,i)$ and $$H_i(\cdot) = (h(i, \cdot, i))^{\frac{p-1}{q}}$$

mod p or $H_i(\bullet)=\zeta^{h_i(i,\bullet,i)}$ mod p, where h($\bullet$) is a strong one way hash and $\zeta$ is another generator of $G_q$. Let ACCEPTABLE($\bullet$) denote an acceptable function which may return true if its pre-image satisfies the given security properties.

Protocol Setup

In the registration phase, the client chooses a name C; in one implementation the MAC address of the client and a password $\pi$, while the server S obtains the client's profile $\langle C, \tau_c \rangle$ where $\gamma=H_0(C,\pi)$, $\gamma'=\gamma^{-1} \bmod p$, $u=h_1(C,\pi)$, $v=g^u$ and $\tau_C=\langle \gamma', v \rangle$.

Protocol Run

A user enters the password $\pi$, and client C is already known. The client C then chooses x at random from $Z^*_q$, and computes $\gamma$ in order to obtain $m=g^x\gamma$. Next, the client C sends a commitment message $\langle C, m \rangle$ to the server S as follows:

C$\rightarrow$S:C, $g^x\gamma$

After or before sending a first message, the client C computes $\gamma'$ and the user's amplified password such that $\omega=u^{-1}(x+m)\bmod q$ by obtaining $u=h_1(C,\pi)$, while waiting for a second message.

Upon receiving the first message, the server S aborts if ACCEPTABLE(C,m•) returns false. Otherwise, the server S fetches $\langle C, \tau_c \rangle$ and chooses y at random from $Z^*_q$ so as to obtain $\mu = v^y$. The server S then computes $\beta = (m\gamma' g^m)^y \equiv g^{(x+m)y} \pmod{p}$ and $k_1 = h_2(C, S, m, \mu, \beta, \gamma')$, and sends a challenge message $\langle \mu, k_1 \rangle$ to the client C as follows:

S→C:$v^y$,$h_2(C,S,m,\mu,\beta,\gamma')$

After or before sending a second message, the server S computes $k'_2 = h_3(C, S, m, \mu, \beta, \gamma')$ while waiting for a third message. The server S aborts if the message times out.

Upon receiving the second message, the client C raises $\mu$ to the amplified password so that $\alpha = \mu^\omega \equiv g^{(x+m)} \pmod{p}$, and computes $k'_1 = h_2(C, S, m, \mu, \alpha, \gamma')$. If it is determined that $k_1$ is not equal to $k'_1$, the client C aborts the session. Otherwise, the client C computes $k_2 = h_3(C, S, m, \mu, \alpha, \gamma')$, and sends a response to the server S as follows:

C→S:$h_3(C,S,m,\mu,\alpha,\gamma')$

After or before sending the third message, the client C computes a session key such that $sk_c = h_4(C, S, m, \mu, \alpha, \gamma')$.

Upon receiving the third message, the server S aborts the session if it is determined that $k_2$ is not equal to $k'_2$. Otherwise, the server S computes a session key $sk_s = h_4(C, S, m, \mu, \beta, \gamma')$, and deletes the other ephemeral keys.

As a result, the client and server authenticate each other using the passwords and agree on the same session key $sk_c$ (=$sk_s$) because $\alpha \equiv \beta \equiv g^{(x+m)y} \pmod{p}$.

In the Authenticated Access process, the AP may be pre-configured with a short, human-memorable password. The password can be stored in an external or internal non-volatile memory device. The password is preferably not derived from any AP information that can be observed by an intruder, such as MAC address or SSID. Examples of valid passwords may include a random four-digit personal identification number (PIN), a five-digit PIN assigned by a service provider or a serial number labeled by the manufacturer of a client device.

In one implementation, a timeout value can be associated with the process. In one implementation, the timeout value is intended to be used in the event of a handshake failure (e.g., one device powers down in the middle of a handshake.) and is not used after successful association. The timeout value may be device or application dependent, and the default value may be set at, for example, ten seconds.

Upon completion of the Challenge exchange, a start message exchange (steps 507 and 509) commences including sharing an operational key between the AP and the client. Upon verification of the operational key, the client and the AP enter the operational phase using a status message exchange (step 511).

Figure 5B:
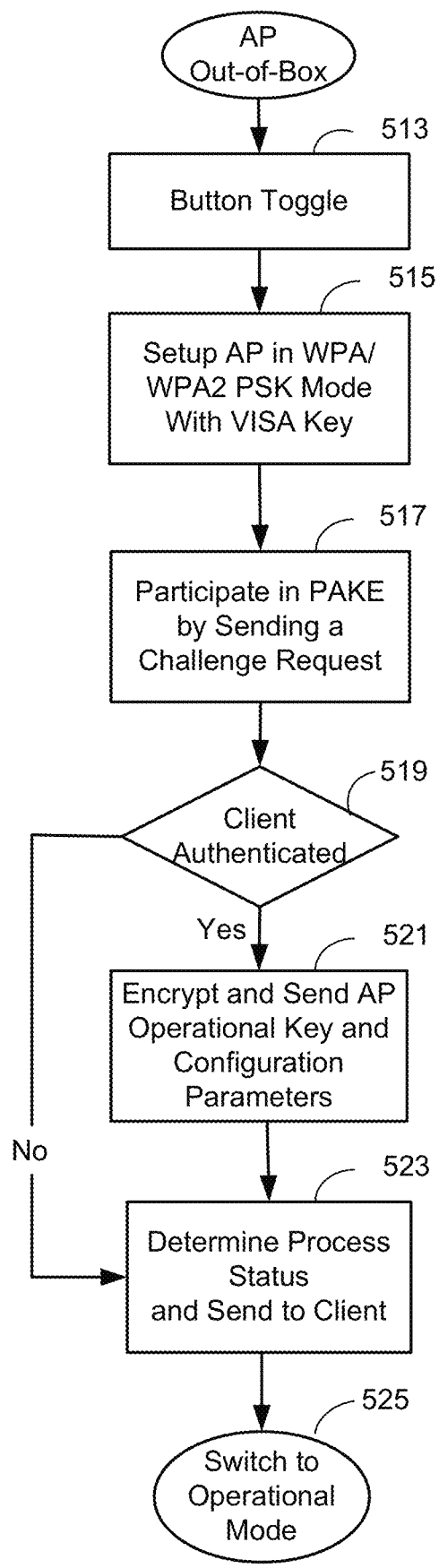
FIG. 5B is a flow diagram of an exemplary Authenticated Access process from an AP perspective.

FIG. 5B is a flow diagram of an exemplary Authenticated Access process from an AP perspective.

First, after toggling a Button (step 513), either in physical or GUI or other form, the AP awaits a probe request or association request from a client. Once a probe request or association request has been received, the AP responds by advertising its capability through a probe response containing an information element. The selected AP then transmits its ASSID, which is unique to each AP, to the client, and generates a VISA key to enter the passport control phase (step 515). As discussed earlier, the VISA key can be a client-specific WPA-PSK or WPA2-PSK PMK used to establish a secure WPA/WPA2 session during the process. In one implementation the AP only permits clients with a valid VISA key for association.

Next, the client initiates an authentication process (e.g., a Three-pass mutual authentication using the Three-Pass Password-based Authenticated Key Exchange (PAKE) protocol) with the associated AP by sending an initiate message containing authentication information (step 517). The authentication exchange commences using challenge request and response messages. A challenge request message sent from an AP to a client containing an unencrypted challenge text, and a challenge response message encrypted with the challenge text as requested by the AP may contain a format as defined by Tables 16 and 17, respectively.

TABLE 16

Challenge Request

| Field | Size (bytes) | Description |
|---|---|---|
| CmdCode | 2 | ALCMD_CHALLENGE | 0x8000 |
| Size | 2 | Number of bytes in the body |
| SeqNum | 2 | The sequence number assigned by the sender |
| Result | 2 | Command execution result, set to zero |

TABLE 17

Challenge Response

| Field | Size (bytes) | Description |
|---|---|---|
| CmdCode | 2 | ALCMD_CHALLENGE |
| Size | 2 | Number of bytes in the body |
| SeqNum | 2 | The sequence number assigned by the sender |
| Result | 2 | Command execution result |
| EncryptedText | N | DHIES encrypted key information |

Although a challenge request message exchange is illustrated, a challenge request message exchange may not be required depending on a specific application and its requirement.

Following completion of the challenge exchange and authentication of the client (step 519), an operational key is securely generated and transferred in the start message exchange (step 521). In one implementation of the Authenticated Access process, the operational key is encrypted by the AP using the shared secret obtained from DHIES that uses symmetric encryption, message authentication, and hashing. DHIES provides a capability of encrypting arbitrary bit strings that other security applications may not. A pictorial representation of DHIES is shown in FIG. 5D; the shaded blocks comprise the ciphertext.

Figure 5C:
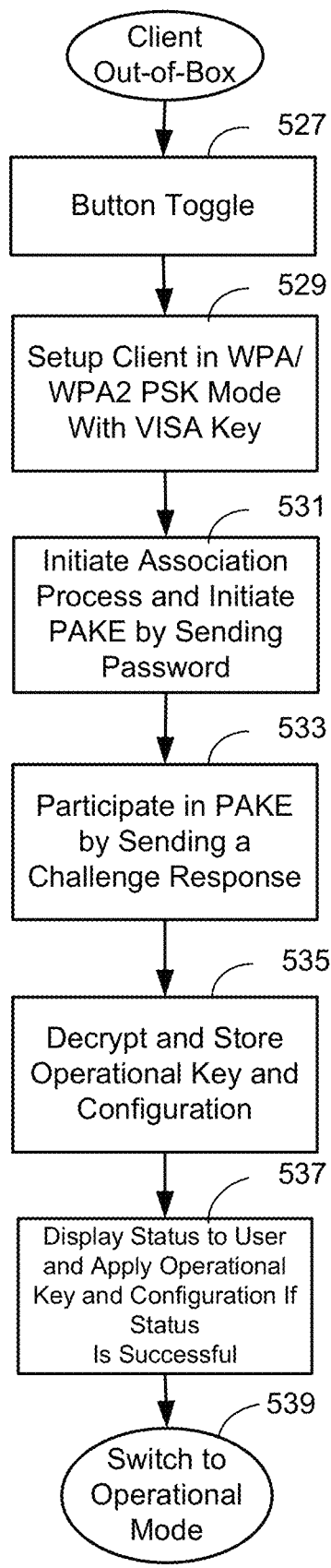
FIG. 5C is a flow diagram of an exemplary Authenticated Access process from a client perspective.
Figure 5D:
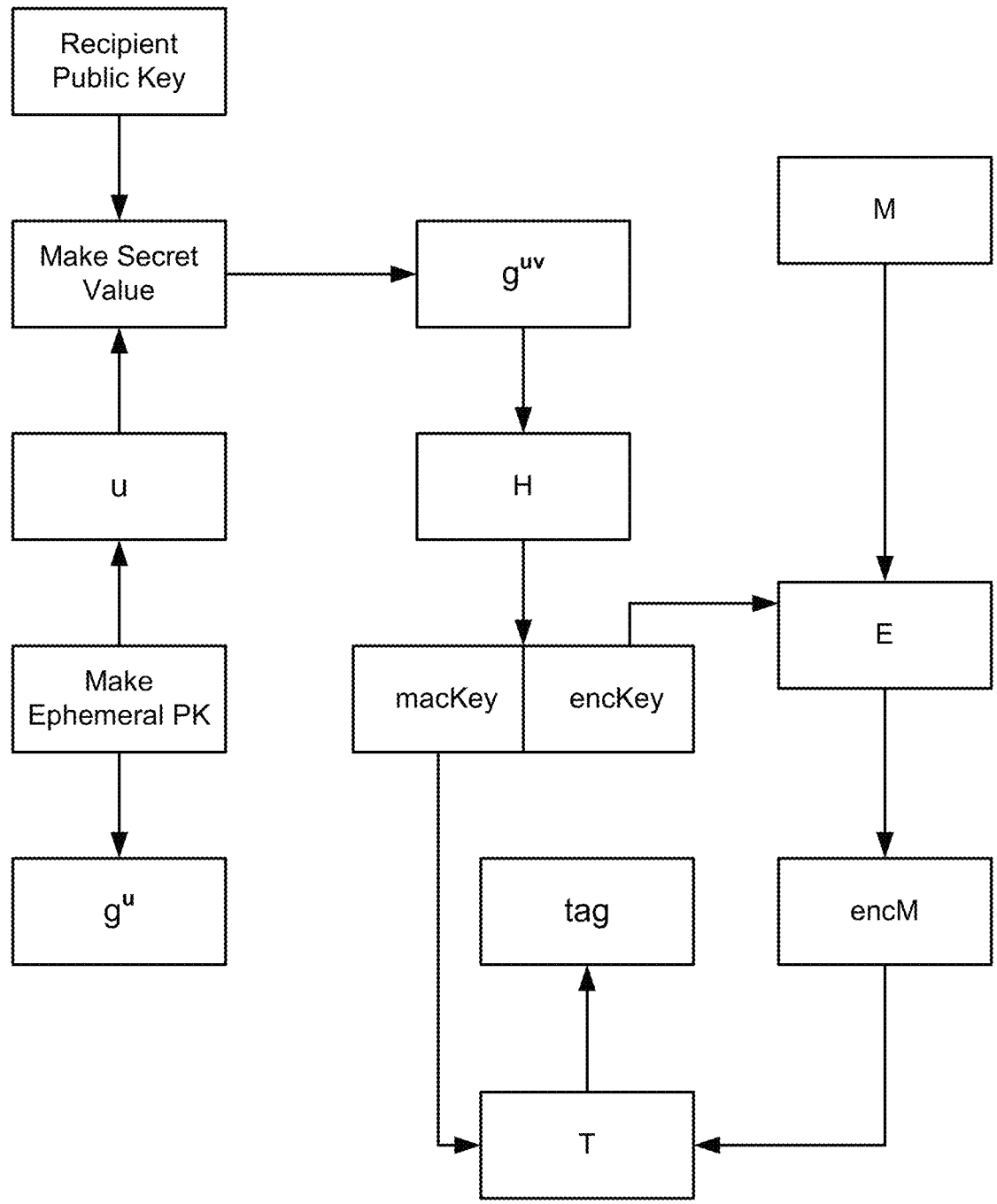
FIG. 5D illustrates an exemplary Diffie-Hellman Integrated Encryption Scheme (DHIES) process for generating a key.

As shown in FIG. 5D, for both parties A and B, the public key and secret key are $g^v$ and v, respectively. To send an encrypted message, using a random "u," an ephemeral public key, $g^u$ is determined. Including $g^u$ in the ciphertext provides an "implicit" Diffie-Hellman key exchange. Both sender and a receiver will be able to determine if the value of $g^{uv} \cdot g^{uv}$ is passed to the hash function H (block H) which results in two keys; namely a MAC (Message Authentication Code) key, "macKey," and an encryption key, "encKey." The message to be sent is symmetrically encrypted (block E) using, for example, the NIST AES key wrap algorithm (block M) as in the Simple Access process with the encryption Key. The resulting ciphertext is MAC encrypted (block T) using the MAC key. The ciphertext (tag) comprises the ephemeral public key, the symmetrically encrypted plaintext and the authentication tag generated by the MAC.

In one implementation, to increase the randomness of the operational key, a timestamp may optionally be used as one of the unique inputs. Alternatively, in another implementation, the operational key for entry into the operational phase may be derived using the PRF-128 format disclosed in the Simple Access process above; namely, each byte of the hexadecimal operational key is coded as an ASCII character resulting in 32 bytes of ASCII hexadecimal representation, so that the 32-character operational key can be used as a WPA passphrase.

While the foregoing describes only an operational key, those skilled in the art will recognize that other configuration parameters, such as DHCP and IP address, also can be shared in the exchanges. The AP may also maintain a list of client MAC addresses currently associated with the process to prevent rogue clients from initiating a session using one of the listed MAC addresses.

Next, the handshake is terminated during the status message exchange (step 523), at which point the AP and the client enter the operational phase (step 525) using the operational key generated and the received SSID.

FIG. 5C is a flow diagram of an exemplary Authenticated Access process from a client perspective. As shown in FIG. 5C, after toggling a button, or otherwise initiating the process (step 527), an out-of-the-box client actively searches for an AP based on a probe response containing an information element received from one or more APs. If multiple APs are present, the client may select to associate with an AP based on the RSSI with respect to each detected AP. The client may attempt to establish a link with the AP(s) advertising a particular information element in the received probe responses first and then with the AP that has the highest RSSI. In one implementation, if the client fails to establish connection with an AP advertised in the information element, the client may proceed to establish a connection with an AP having a highest RSSI.

Once a desired AP has been identified, the client associates with the selected AP by using a VISA key to enter the passport control phase (step 529). Again, the VISA key may be a PMK for establishing a secure WPA/WPA2 session. In one implementation, the AP only permits clients with a valid VISA key for association. If the client fails to enter the passport control phase with the AP after a preset number of attempts, another AP can be chosen based on, for example, RSSI.

Next, the client initiates a handshake using an initiate message, participates in an asymmetric key exchange (step 531) and awaits the associated AP to challenge and authenticate the client (step 533). Once the Challenge exchange is successfully completed, an operational key is securely generated during the start message exchange, and received and stored (step 535). Thereafter, the handshake is terminated. The status message exchange (step 537) can include display of status of information to a user. Thereafter, the client enters the operational phase (step 539) with the AP using the operational key generated and the received ASSID.

In the Authenticated Access process, in addition to protection against passive monitoring, active/passive dictionary, MAC spoofing and packet replay, the use of Diffie-Hellman asymmetric key exchange and DHIES provide security against rogue AP, rogue client, man-in-the-middle and Session Hijack, and more sophisticated spoofing techniques.

In one implementation, for a legacy client to associate with an AP, the AP can display the operational key to users via its physical or GUI button to associate the legacy client with the AP manually. In one implementation, a legacy client already associated with an AP is not affected by traffic related to the process.

In one implementation, if users manually reconfigure operational parameters of an AP, such as SSID and/or a security profile, while one or more clients are already associated with the AP, any newly modified operational parameter will override previous settings (e.g., from WPA to WPA2) to reflect the user's intent. For example, after users manually configure an AP with a desired SSID or security profile, the modified setting propagates to the associated client for synchronization upon invoking an association between the client and the AP, and overrides its corresponding default setting.

In one implementation, the process supports wired equivalent privacy (WEP) encryption, which encrypts a frame body (not headers) of each data frame. To support devices operating in WEP, an AP may configure its security profile and its capabilities accordingly. Similarly, a client may be synchronized with the AP's advertised security profile to operate correspondingly.

Guest Access

The association process may allow guest access using, in one implementation, multiple SSIDs. A guest SSID may be established in addition to any existing SSID, and a separate VISA key may be generated for the passport control phase based on the guest SSID. A guest operational key different from that used in the Simple Access process or the Authenticated Access process may be employed in the operational phase. The Guest SSID may be used when the process cannot be activated on the default SSID, in order to limit access to certain subnets, with a virtual local area network (VLAN), applications or AP ports, in association with timing constraints under which guest access expires or limitations related to resource utilization (e.g., bandwidth).

To further demonstrate the usability, security, interoperability and performance of the process, the following are examples for configuring a link between an AP and a client.

Example A

Consumer Electronics: Game Console and Peripheral

Connecting a Game Console and a Controller Using Simple Access Process

To securely associate a game console with a controller, the process may include, but not be limited to, connecting a game console with a controller using the Simple Access process; powering up the game console (AP) and its peripherals (e.g., enrollee and client); pressing buttons on both game console and controller; observing LED on the controller to indicate that the association is successful. (e.g., to indicate that the game console has been configured, and settings have been transferred to the controller); and using the controller to access the game console to perform functions such as selecting games/modes, sending physical coordinates, and sending/receiving audio/video. In order to add a second controller after purchasing controller, a user presses buttons on both the game console and controller, and waits for the LED to indicate that the association is successful. (e.g., the game console has successfully transferred all required settings to the controller).

If the removal of a controller is desired, the process may simply involve navigating and viewing a list of associated peripherals connected to the game console on a display unit (e.g., TV or LCD screen) by using a controller or input peripherals (e.g., via button on game console or remote control); probing the list containing all associated devices; and identifying the device to be removed.

To reset all settings to original settings, the user may first determine if previous setup has been securely breached; and perform and restore all settings to factory default by using a physical button or GUI on a display unit.

Example B

Home Network: AP and PC Client

Setting Up/Connecting an Access Point or Wireless Home Gateway/Router Using Authenticated Access Mode For home network, configuring a router using Authenticated Access may include, but not be limited to, locating a WiFi label on the router indicating that it supports Authenticated Access; powering up the router; pressing a button on the router and a client card; the client card prompting the user to enter an Access Code located on the router; visually acquiring the Access Code and entering the Access Code via the client card utility GUI; and observing the LED to indicate that the router has been configured successfully. In this example, the configuration settings, including self-generated SSID, operational key, and other operational parameters, also can be transferred from the AP to the client card during the association.

To add a new or second Authenticated Access wireless client(s), a user may follow the same configuration procedure as that executed for the router configuration. Specifically, the procedure may include pressing buttons on both the AP and a second client; entering the access code into the client utility of the client; and transferring Authenticated Access settings from the AP to the second client. The procedure can be executed without any interruption to the usability of the first or any existing client(s) already associated with the AP.

For a legacy wireless client that only supports security profiles (e.g. WPA-PSK, WPA2-PSK) but does not support the described association process, a user may use a web browser with a designated name of the AP as a URL to reveal the pass-phrase/key settings of the AP. The user may then manually enter this pass-phrase to the legacy wireless client utility just as in legacy WPA/WPA2 usage.

To remove a client, the user may access the AP using a web browser with a designated name of the AP as the URL or via an utility program supplied by the manufactures/vendors. In one implementation, because all clients are logged, the user can examine a list of clients already configured by the process. Upon clicking or manipulating a web GUI, the user can instantaneously remove any of the associated clients previously connected. Once the selected client has been removed, a security mechanism may be executed at the AP for denying this client any future access related to the AP.

A user may also select whether a new operational key is to be generated. In one implementation, the user may replace all operational keys utilized by existing clients associated with an AP with new operational keys. Alternatively, the user may opt for new keys to be distributed to a particular client.

Example C

Consumer Electronics: VoIP Handset and Base Unit

Setup/Connecting Wireless Voice Base Unit and Handsets in Authenticated Access Mode (WiFi Telephony)

Typically, a cordless/WiFi phone contains a base unit and handset. Alternatively, the base unit and the handset can be sold separately. An association between the base unit and the handset can be configured in one of two ways. First, the manufacturer may provide an Access Code label (e.g., unique 10-digit alphanumeric pass-phrase followed by a # sign: "SKYPE12345#") attached to the base unit and manuals documenting simple instructions requesting a user to enter the pass-phrase when prompted.

Similar to the aforementioned method for manual configuration by a user, the manufacturer may utilize the process to set up an association between the base unit and handset at the factory in advance prior to packaging. This allows an operational key to be pre-installed in the memory of the handset, and reduces the logistics hassle of programming the base unit and the handset. If the operational key is pre-installed as described above, the base unit and the handset may modify the OoB configurations with only a mere press on their button using a predefined pattern. Alternatively, the user can be prompted to enter an access code for authentication.

If a new or additional handset to the existing base unit is desired, a user only needs to toggle the buttons on the base unit and the new handset, and visually acquire and enter an access code, which may be found on the base unit, using the handset keypad. Once a visual or audio cue on either of the base unit or the handset indicates the connection of the handset, the new handset to the base unit may then be used in conjunction with other base units.

To remove a desired handset, the currently-configured handset can be browsed through a basic display unit (e.g., small LCD screen) of the base unit displaying its security settings, and a user may optionally select a desired handset to be removed from a list containing all associated handsets.

Example D

Home/SOHO Network: Multi-Function AP with Guest Network

A conventional home gateway/router device may generally support both the Simple Access process and the Authenticated Access process through the use of 2 separate BSSs. The Simple Access process can be used for a guest network, which provides an express way to use a general internet connection, printer sharing, or media streaming. However, unlike the Authenticated Access process which allows devices to have complete privacy on a private network, devices connected to a guest network may have limited access and may be isolated from the private network.

In setting up an OotB gateway/router in the Authenticated Access process, a user normally powers an OotB gateway/router that is enabled for both the Authenticated and the Simple Access processes by default, and a wireless client (e.g., on a laptop) that also supports the process. A typical client can be configured to support both Simple Access and Authenticated Access capability. On the client utility, the user may have an option to choose between Authenticated Access process or Simple Access process.

After selection, the user presses the buttons on the gateway/router and the wireless client in a designated pattern. While the gateway/router simultaneously supports both Authenticated Access and Simple Access guest network, the client may only select the Authenticated Access guest network. The software loaded on the client then prompts the user to enter an access code labeled on the gateway/router. Upon an indication that the Authenticated Access network is set up successfully, the client is linked to the gateway/router.

Depending on a manufacturer's configuration, a Guest Access Network can be enabled or disabled by default. If the Guest Access Network is enabled by default, the Guest Access Network can be configured at the same time when the Authenticated Access is initially set up. The Guest Access Network can exist as a different BSS if the Guest Access Network is set up as a secondary Guest Access Network. If the Guest Access Network is not enabled by default, yet the Guest Access Network is preferred, the user may enable the Guest Access Network by configuring the AP to enable the Guest Access Network. The button on the AP can also be configured to act on the Authenticated Access Network, the Guest Access Network or both.

The Guest Access Network for general internet access or printer sharing can be achieved by toggling the buttons on the AP and the client. The configuration of Guest Access Network can be such that it allows general internet access and printer access or a limited access duration, unless an explicit permission by a non-guest user or administrator is given.

Additional devices may also be added to the Guest Access Network. For example, upon pressing the button on the multi-function router with print server function, a Wi-Fi camera may send image(s) to the router for printing.

Security

In the association process, it is advantageous in some implementations to use only existing security mechanisms for the Home/SOHO wireless network; namely, WPA-PSK and WPA2-PSK. When used properly, these mechanisms are sufficient to secure the intended applications. This not only allows the process to be employed on existing hardware, it also does not hinder the development of enhanced security mechanisms.

The Home/SOHO network typically lacks sensitive data and is perceived to carry a low expectation of threat. This does not mean that typical users are not concerned about security measures, but that their willingness to spend financial resources in addressing security concerns is low. To provide flexibility, the process features two security levels that allow an AP and a client to support a desired security level suitable for any application against unauthorized access without introducing complexities to the overall configuration; some of which include passive monitoring, offline dictionary, rogue AP, rogue client, man-in-the-middle (MiTM) (i.e., combination of rogue AP and rogue client), denial of service (DoS) attacks comprising repeated protocol frames to overload the AP or client, jamming (e.g., jamming of the RF medium), active dictionary, packet replay by capturing and replaying packets, session hijack, and MAC Spoofing.

As discussed earlier, for both Simple Access and Authenticated Access processes, a VISA key can be used as a WPA-PSK key value when an AP and client are in the passport control phase. The VISA key can be derived at both the AP and the client using a pass-phrase-to-PSK mapping algorithm as defined in clause H.4 of the 802.11(i) specification, or Password-Based Key Derivation Function 2 (PBKDF2), as defined in Password-Based Cryptography Standard #5 version 2.0, the disclosure of each of which is incorporated herein by reference.

Specifically, the VISA WPA-PSK key value may contain a format as defined below.
VISA WPA-PSK key value=PBKDF2 ("Password", "Salt S", "Salt Len", "4096", "256")
wherein:
a) "Password" is a 32 byte preset value shared by an out-of-band method between the AP and client;
b) "Salt S" is derived by concatenation: S=MD5 hash ((AP MAC Address)||(STA MAC Address));
c) "Salt Len" is 16 bytes;
d) "4096" is the number of times the Password is hashed; and
e) "256" is the number of bit output by Password mapping.

The resulting VISA key is unique to each AP/client pair. Using PBKDF2 to derive the VISA key ensures the same level security as using a password based on the 802.11(i) pass-phrase to PSK mapping scheme.

In Authenticated Access, the passport control phase requires that the client authenticates with a corresponding AP. The AP is assumed to carry an unique access code in a non-volatile storage, and the same Access Code may be found in the form of a factory-assigned physical label. Alternatively, the access code may be acquired from a service provider (e.g., Cable Modem, DSL, VoIP service provider). Before invoking the process, a user can be prompted to enter an access code via a user interface provided on the client.

Similar to the Simple Access process, once the user invokes the process by toggling buttons or otherwise, the AP and client perform association during the passport control phase, and key information (e.g., Diffie-Hellman public key information) can be exchanged to establish a shared secret. For example, upon entering a password, the client generates and transmits a message (e.g., <C,m>) to the associated AP as part of an initiate frame.

In response, the AP sends the client a challenge message (e.g., $<\mu,k_1>$) contained in a challenge request frame, and the client responds by sending an challenge response frame containing another message (e.g., $k_2$). If it is determined that the other message contained in the challenge response frame (i.e., $k_2$) is equivalent to an internally generated $k'_2$, the AP establishes a session key (e.g., $sk_c$) for encrypting an operational key. Otherwise, the AP aborts, and sends the client a status message indicating failure of the handshake.

The user can be notified of this failure via an user interface or other external or internal display unit. Upon detection of failure, the process also may elect to take evasive action to prohibit further access by the same client. If authentication is successful, the AP transmits the encrypted operational key needed for entering the operational phase to the client.

The above description of illustrated implementations of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, the steps of the flowcharts shown in FIGS. 1B, 4A-4C and 5A-5C can be performed in a different order and still achieve desirable results.

Also, to achieve the results in the implementations described above, an access point comprising a transmitting element (e.g., adapted to initiate a communication request and providing a unique service set identifier and messages to a client), a receiving element (e.g., adapted to receive client input from the client), a generating element (e.g., adapted to generate operational information responsive to the client input), an engine (e.g., adapted to generate a unique service set identifier (SSID)) can be provided. Similarly, a client comprising a detecting element (e.g., adapted to detect a presence of an access point), a configuration engine (e.g., adapted to generate a graphical user interface including a prompt to a user after detecting the presence of the access point and to detect a response from the user), a transmitting element (e.g., adapted to transmit settings of the client to the access point in response to the prompt), a receiving element (e.g., adapted to receive operational information from the access point), a decrypting element (e.g., adapted to decrypt the operational information), and an engine (e.g., adapted to generate an operational key from the operational information) also can be provided.

Figure 7A:
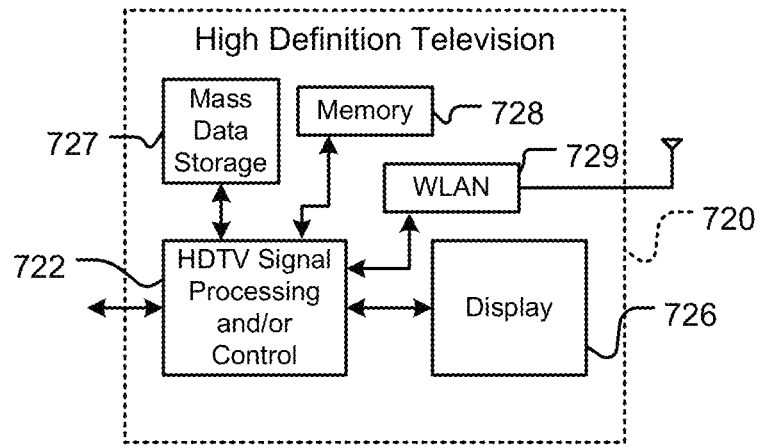
FIGS. 7A-7E show various exemplary implementations of the described systems and techniques.

FIGS. 7A-7E show various exemplary implementations of the described systems and techniques. Referring now to FIG. 7A, the described systems and techniques can be implemented in a high definition television (HDTV) 720. The described systems and techniques may be implemented in either or both signal processing and/or control circuits, which are generally identified in FIG. 7A at 722, a WLAN interface and/or mass data storage of the HDTV 720. The HDTV 720 receives HDTV input signals in either a wired or wireless format and generates HDTV output signals for a display 726. In some implementations, signal processing circuit and/or control circuit 722 and/or other circuits (not shown) of the HDTV 720 may process data, perform coding and/or encryption, perform calculations, format data and/or perform any other type of HDTV processing that may be required.

The HDTV 720 may communicate with mass data storage 727 that stores data in a nonvolatile manner such as optical and/or magnetic storage devices (e.g., a hard disk drive (HDD)). The HDD may be a mini HDD that includes one or more platters having a diameter that is smaller than approximately 1.8". The HDTV 720 may be connected to memory 728 such as RAM, ROM, low latency nonvolatile memory such as flash memory and/or other suitable electronic data storage. The HDTV 720 also may support connections with a WLAN via a WLAN network interface 729.

Figure 7B:
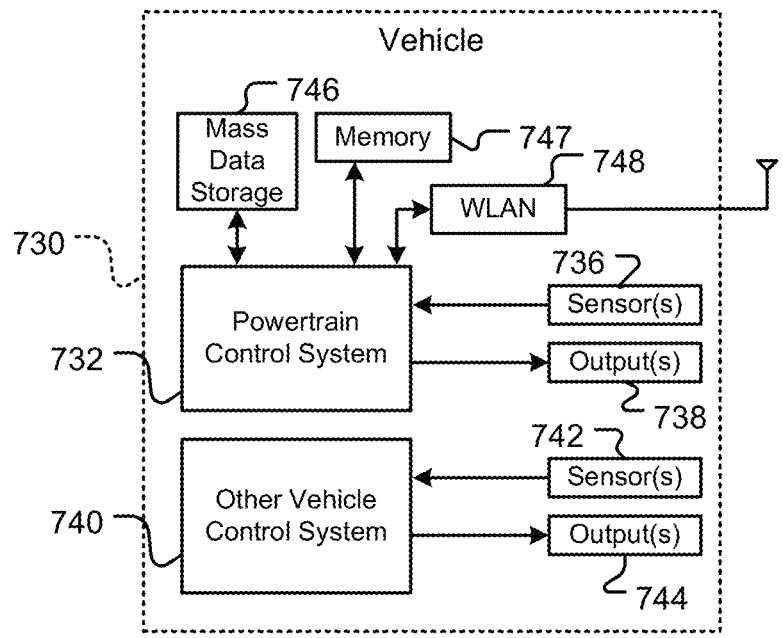

Referring now to FIG. 7B, the described systems and techniques may be implemented in a control system of a vehicle 730, a WLAN interface and/or mass data storage of the vehicle control system. In some implementations, the described systems and techniques may be implemented in a powertrain control system 732 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The described systems and techniques may also be implemented in other control systems 740 of the vehicle 730. The control system 740 may likewise receive signals from input sensors 742 and/or output control signals to one or more output devices 744. In some implementations, the control system 740 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 732 may communicate with mass data storage 746 that stores data in a nonvolatile manner. The mass data storage 746 may include optical and/or magnetic storage devices for example hard disk drives HDD and/or DVDs. The HDD may be a mini HDD that includes one or more platters having a diameter that is smaller than approximately 1.8". The powertrain control system 732 may be connected to memory 747 such as RAM, ROM, low latency nonvolatile memory such as flash memory and/or other suitable electronic data storage. The powertrain control system 732 also may support connections with a WLAN via a WLAN network interface 748. The control system 740 may also include mass data storage, memory and/or a WLAN interface (all not shown).

Figure 7C:
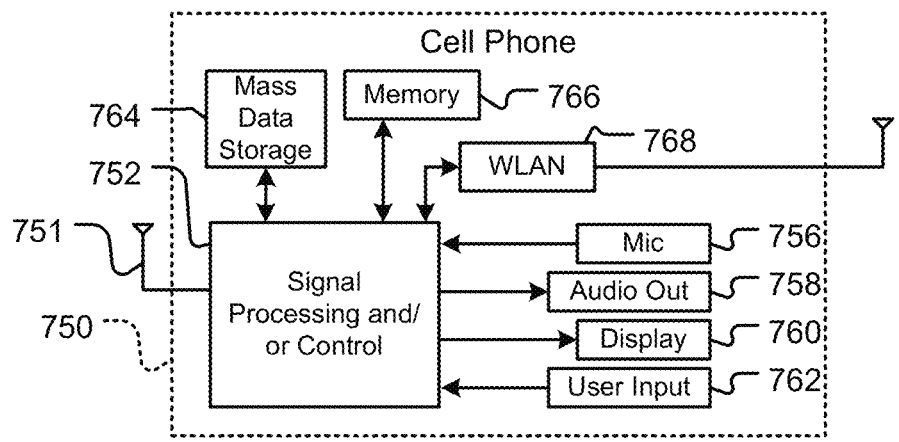

Referring now to FIG. 7C, the described systems and techniques can be implemented in a cellular phone 750 that may include a cellular antenna 751. The described systems and techniques may be implemented in either or both signal processing and/or control circuits, which are generally identified in FIG. 7C at 752, a WLAN interface and/or mass data storage of the cellular phone 750. In some implementations, the cellular phone 750 includes a microphone 756, an audio output 758 such as a speaker and/or audio output jack, a display 760 and/or an input device 762 such as a keypad, pointing device, voice actuation and/or other input device. The signal processing and/or control circuits 752 and/or other circuits (not shown) in the cellular phone 750 may process data, perform coding and/or encryption, perform calculations, format data and/or perform other cellular phone functions.

The cellular phone 750 may communicate with mass data storage 764 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 750 may be connected to memory 766 such as RAM, ROM, low latency nonvolatile memory such as flash memory and/or other suitable electronic data storage. The cellular phone 750 also may support connections with a WLAN via a WLAN network interface 768.

Figure 7D:
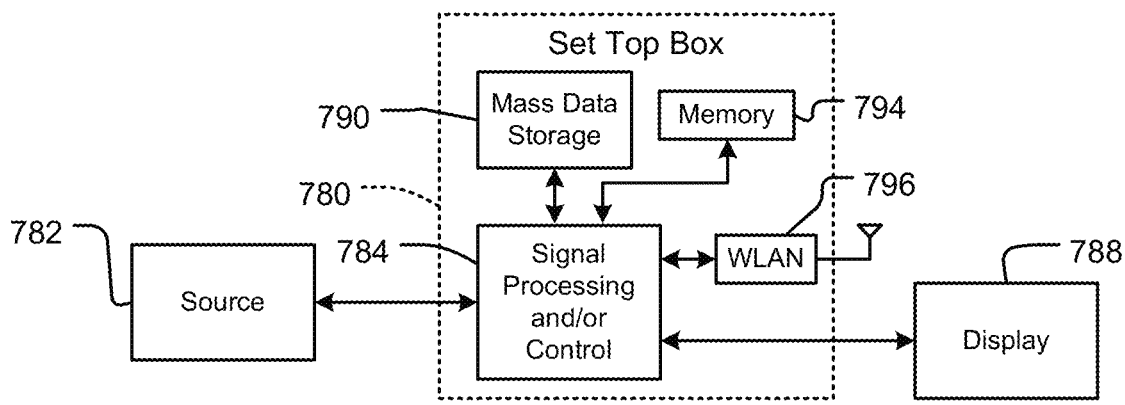

Referring now to FIG. 7D, the described systems and techniques can be implemented in a set top box 780. The described systems and techniques may be implemented in either or both signal processing and/or control circuits, which are generally identified in FIG. 7D at 784, a WLAN interface and/or mass data storage of the set top box 780. The set top box 780 receives signals from a source 782 such as a broadband source and outputs standard and/or high definition audio/video signals suitable for a display 788 such as a television and/or monitor and/or other video and/or audio output devices. The signal processing and/or control circuits 784 and/or other circuits (not shown) of the set top box 780 may process data, perform coding and/or encryption, perform calculations, format data and/or perform any other set top box function.

The set top box 780 may communicate with mass data storage 790 that stores data in a nonvolatile manner. The mass data storage 790 may include optical and/or magnetic storage devices for example hard disk drives HDD and/or DVDs. The HDD may be a mini HDD that includes one or more platters having a diameter that is smaller than approximately 1.8". The set top box 780 may be connected to memory 794 such as RAM, ROM, low latency nonvolatile memory such as flash memory and/or other suitable electronic data storage. The set top box 780 also may support connections with a WLAN via a WLAN network interface 796.

Figure 7E:
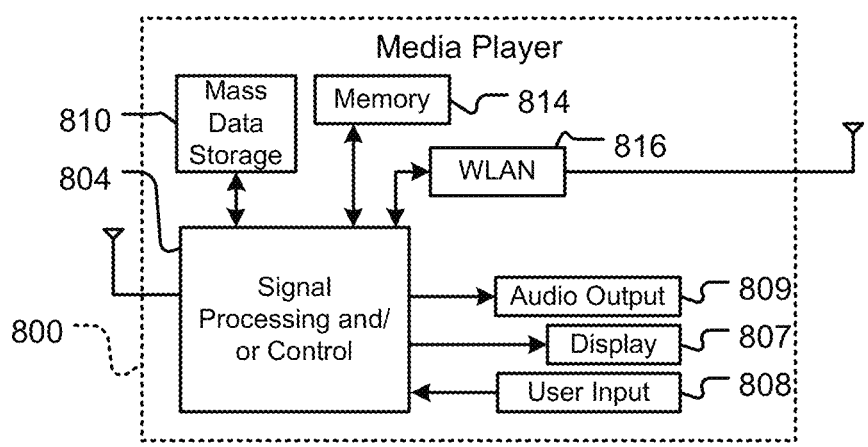

Referring now to FIG. 7E, the described systems and techniques can be implemented in a media player 800. The described systems and techniques may be implemented in either or both signal processing and/or control circuits, which are generally identified in FIG. 7E at 804, a WLAN interface and/or mass data storage of the media player 800. In some implementations, the media player 800 includes a display 807 and/or a user input 808 such as a keypad, touchpad and the like. In some implementations, the media player 800 may employ a graphical user interface (GUI) that typically employs menus, drop down menus, icons and/or a point-and-click interface via the display 807 and/or user input 808. The media player 800 further includes an audio output 809 such as a speaker and/or audio output jack. The signal processing and/or control circuits 804 and/or other circuits (not shown) of the media player 800 may process data, perform coding and/or encryption, perform calculations, format data and/or perform any other media player function.

The media player 800 may communicate with mass data storage 810 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 800 may be connected to memory 814 such as RAM, ROM, low latency nonvolatile memory such as flash memory and/or other suitable electronic data storage. The media player 800 also may support connections with a WLAN via a WLAN network interface 816. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more machines to perform the operations described (such as a program encoded in a computer-readable medium, which can be a memory, a storage device, or other physical, machine-readable medium). It will be appreciated that the order of operations presented is shown only for the purpose of clarity in this description. The particular order of operations shown may not be required, and some or all of the operations may occur simultaneously, concurrently or in parallel, in various implementations. Moreover, not all of the operations shown need be performed to achieve desirable results.

Accordingly, other embodiments are within the scope of the following claims.

What is claimed is:

1. A method comprising:
    initiating an association request;
    establishing an association between a first device and a second device different from the first device based on the association request;
    participating in a handshake including exchanging an operational key between the first device and the second device during the handshake, wherein participating in the handshake includes: (i) participating in an authenticated handshake when the association request indicates an authenticated access, and (ii) participating in an unauthenticated handshake when the association request indicates an unauthenticated access; and
    entering an operational phase using the operational key when the handshake is successful,
    wherein initiating the association request, establishing the association, participating in the handshake, and entering the operational phase are performed by one or more wireless communication devices,
    wherein establishing the association includes exchanging a pair-specific lifeline key between the first device and the second device, and
    wherein participating in the unauthenticated handshake includes participating in a key exchange to establish a shared secret between the first device and the second device.

2. The method of claim 1, further comprising receiving a probe request broadcast by the first device to a plurality of devices including the second device.

3. The method of claim 2, further comprising transmitting, from the second device to the first device, a probe response responsive to the probe request and which indicates one or more available security modes with at least one security mode associated with the authenticated access or the unauthenticated access, and a unique service set identifier that distinguishes the second device from the plurality of devices,
    wherein initiating the association request is performed after transmitting the probe response, the association request indicating the authenticated access or unauthenticated access.

4. The method of claim 1, wherein:
    participating in the authenticated handshake includes participating in a challenge exchange based on a Three-Pass Password-based Authenticated Key Exchange (PAKE) protocol; and
    exchanging the operational key is performed only when the authenticated handshake is successful.

5. The method of claim 4, wherein the shared secret is derived based on an asymmetric Diffie-Hellman key, the method further comprising:
    encrypting, by the second device, the operational key using the shared secret, the encrypted operational key to be used by the first device for entering the operational phase.

6. The method of claim 5, further comprising:
    receiving, by the first device, the encrypted operational key, the encrypted operational key to be used by the first device for entering the operational phase.

7. The method of claim 1, further comprising identifying the second device from a plurality of devices based on a probe response from the second device specifying a plurality of available security modes of which one is used for establishing the association between the first device and the second device,
    wherein initiating the association request is performed after identifying the second device.

8. The method of claim 7, wherein identifying the second device from the plurality of devices is performed based on at least one of an availability of security modes offered by each of the plurality of devices and the second device, or a received signal strength indicator with respect to the plurality of devices and the second device.

9. The method of claim 1, further comprising establishing an association between the first device and a third device different from the second device when the handshake is unsuccessful.

10. The method of claim 1, wherein establishing the association includes transmitting a unique service set identifier and a MAC address associated with the second device to the first device,
    wherein entering the operational phase is performed based on the operational key, the unique service set identifier, and the MAC address.

11. A device comprising:
    a memory for storing data associated with communicating with an external device; and
    a processor coupled with the memory and configured to:
        receive an association request from the external device;
        facilitate a transmission, to the external device, of a probe response containing identification information;
        facilitate an association to exchange a pair-specific lifeline key with the external device;
        facilitate a handshake to exchange an operational key with the external device during the handshake, wherein the handshake is an authenticated handshake when the association request indicates an authenticated access and an unauthenticated handshake when the association request indicates an unauthenticated access, and wherein the unauthenticated handshake comprises a key exchange to establish a shared secret with the external device; and grant the external device permission to enter an operational phase using the operational key when the handshake is successful.

12. The device of claim 11, wherein the processor is configured to transmit a unique service set identifier and a MAC address to the external device.

13. The device of claim 11, wherein the probe response indicates one or more available security modes with at least one security mode associated with the authenticated access or the unauthenticated access, and a unique service set identifier that distinguishes the device from other devices.

14. The device of claim 11, wherein the authenticated handshake is performed based on a Three-Pass Password-based Authenticated Key Exchange (PAKE) protocol, and the operational key is exchanged only when the authenticated handshake is successful.

15. The device of claim 11, wherein:
the shared secret is derived based on an asymmetric Diffie-Hellman key; and
the operational key is encrypted using the shared secret to be decrypted by the external device for entering the operational phase.

16. A system comprising:
a first wireless communication device configured to initiate an association request; and
a second wireless communication device configured to:
establish an association with the first wireless communication device based on the association request by at least exchanging a pair-specific lifeline key with the first wireless communication device,
participate in a handshake and exchange an operational key with the first wireless communication device during the handshake, wherein the handshake is an authenticated handshake when the association request indicates an authenticated access, and an unauthenticated handshake when the association request indicates an unauthenticated access, and wherein the unauthenticated handshake comprises a key exchange to establish a shared secret with the first wireless communication device; and
grant the first wireless communication device permission to enter an operational phase using the operational key when the handshake is successful.

17. The system of claim 16, wherein the second wireless communication device is configured to transmit a probe response that indicates a plurality of security modes available for selection by the first wireless communication device, the plurality of security modes including at least one security mode associated with the authenticated access, at least one security mode associated with the unauthenticated access, and at least one security mode associated with a guest access that allows a guest service set identifier to be issued to the first wireless communication device.

18. The system of claim 17, wherein the association request indicates a selection of one of the authenticated access, unauthenticated access, or guest access.

19. The method of claim 1, wherein participating in the handshake comprises retrieving an identity of the first device and confirming authorization of the first device if the association request indicates an authenticated access.

20. The method of claim 1, wherein participating in the handshake comprises:
transmitting an encrypted version of the operational key to the first device based on a successful authorization of the first device if the association request indicates an authenticated access, and
transmitting an encrypted version of the operational key to the first device without authenticating the first device if the association request indicates an unauthenticated access.

\* \* \* \* \*